United States Patent [19]
Goddard et al.

[11] Patent Number: 5,696,955
[45] Date of Patent: Dec. 9, 1997

[54] FLOATING POINT STACK AND EXCHANGE INSTRUCTION

[75] Inventors: Michael D. Goddard; Scott A. White, both of Austin, Tex.

[73] Assignee: Advanced Micro Devices, Inc., Sunnyvale, Calif.

[21] Appl. No.: 252,303

[22] Filed: Jun. 1, 1994

[51] Int. Cl.$^6$ .................................................. G06F 9/38
[52] U.S. Cl. .................................... 395/563; 395/566
[58] Field of Search ............................ 395/800, 375, 395/563, 566

[56] References Cited

U.S. PATENT DOCUMENTS

| | | |
|---|---|---|
| 4,161,784 | 7/1979 | Cushing et al. . |
| 4,736,288 | 4/1988 | Shintani et al. . |
| 4,807,115 | 2/1989 | Torng . |
| 4,928,223 | 5/1990 | Dao et al. . |
| 4,992,938 | 2/1991 | Cocke et al. . |
| 5,056,006 | 10/1991 | Acharya et al. . |
| 5,155,816 | 10/1992 | Kohn . |
| 5,155,820 | 10/1992 | Gibson . |
| 5,226,130 | 7/1993 | Favor et al. . |
| 5,367,650 | 11/1994 | Sharangpani et al. . |
| 5,499,352 | 3/1996 | Clift et al. ........................ 395/412 |

FOREIGN PATENT DOCUMENTS 2281422  1/1995  United Kingdom .

OTHER PUBLICATIONS

Donald Alpert and Dror Avnon of Intel Corporation, Architecture of the Pentium Microprocessor, 1993 Jun., pp. 11–21, 8207 IEEE Micro 13(1993) Jun., No. 3, Los Alamitos, CA US.

Bob Ryan, M1 Challenges Pentium, 1994 Jan., pp. 83–87, 4465 Byte 19(1994) Jan., No. 1, Peterborough, NH, US.

Dave Bursky, Traditional CISC CPUs and MPUs Move Towrd RISC to Boost Performance, 1994 Dec. 05,2328 Electronic Design 42(1994) Dec. 05, No. 25, Cleveland, OH, US.

Val Popescu, et al., "The Metaflow Architecture", IEEE Micro, Jun. 1991, vol. 11, No. 3, pp. 10–13, 63–73.

IBM Technical Disclosure Bulletin, "Variable–Performance Processors", vol. 17, No. 12, May 1975, pp. 3708–3710.

U.S. Patent Application Ser. No. 08/146,376, filed Oct. 29, 1993 entitled, "High Performance Load–Store Functional Unit and Data Cache", Wm. M. Johnson, David B. Witt, and Murali Chinnakonda, Attorney Docket No. M–2281 US.

U.S. Patent Application Serial No. 08/233,563, filed Apr. 26, 1994 entitled, "Mixed Integer/Floating Point Core", Scott A. White, Michael D. Goddard, and Wm. M. Johnson, Attorney Docket No. M–2518–1P US.

Toyohiko Yoshida, et al., "The Approach to Multiple Instruction Execution in the GMICRO/400 Processor", ©1991, pp. 185–195.

Gurindar S. Sohi, "Instruction Issue Logic for High–Performance, Interruptible, Multiple Functional Unit, Pipelined Computers", IEEE Transaction on Computers, vol. 39, No. 3, ©1990, pp. 349–359.

Bruce D. Lightner and Gene Hill, "The Metaflow Lightning Chipset", IEEE Proceedings ConpCom Spring '91, Feb. 1991, pp. 13–18.

R.M. Tomasulo, "An Efficient Algorithm for Exploiting Multiple Arithmetic Units", IBM Journal, Jan. 1967, vol. 11, pp. 25–32.

Brian Case, "AMD Unveils First Superscalar 29K Core", Microprocessor Report, Oct. 24, 1994, pp. 23–26.

Michael Slater, "AMD's K5 Designed to Outrun Pentium", Microprocessor Report, Oct. 24, 1994, pp. 1, 6–11.

Primary Examiner—William M. Treat
Attorney, Agent, or Firm—Skjerven, Morrill, MacPherson, Franklin & Friel LLP; Ken J. Koestner

[57] ABSTRACT

In a processor (110) that performs multiple instructions in a single cycle, predicts outcomes of branch conditions and speculatively executes instructions based on the branch predictions, a method and apparatus for operating a data stack utilize a remap array (674) to support a stack exchange capability. The remap array is used to correlate a stack pointer (672) to data elements (700) within the stack. A lookahead stack pointer (502) and remap array (504) are updated to preserve the processor's state of operation while speculative instructions are executed.

27 Claims, 24 Drawing Sheets

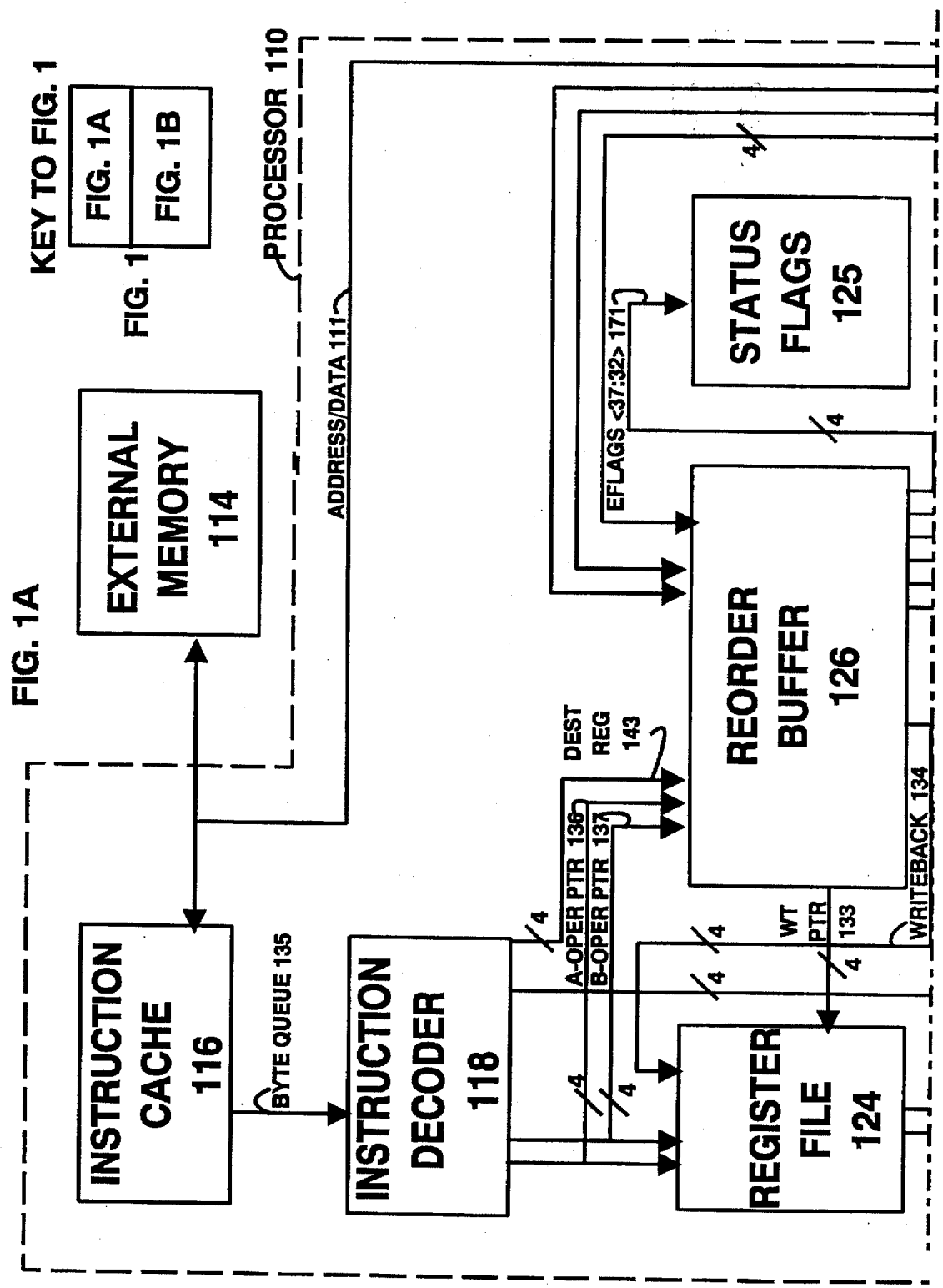

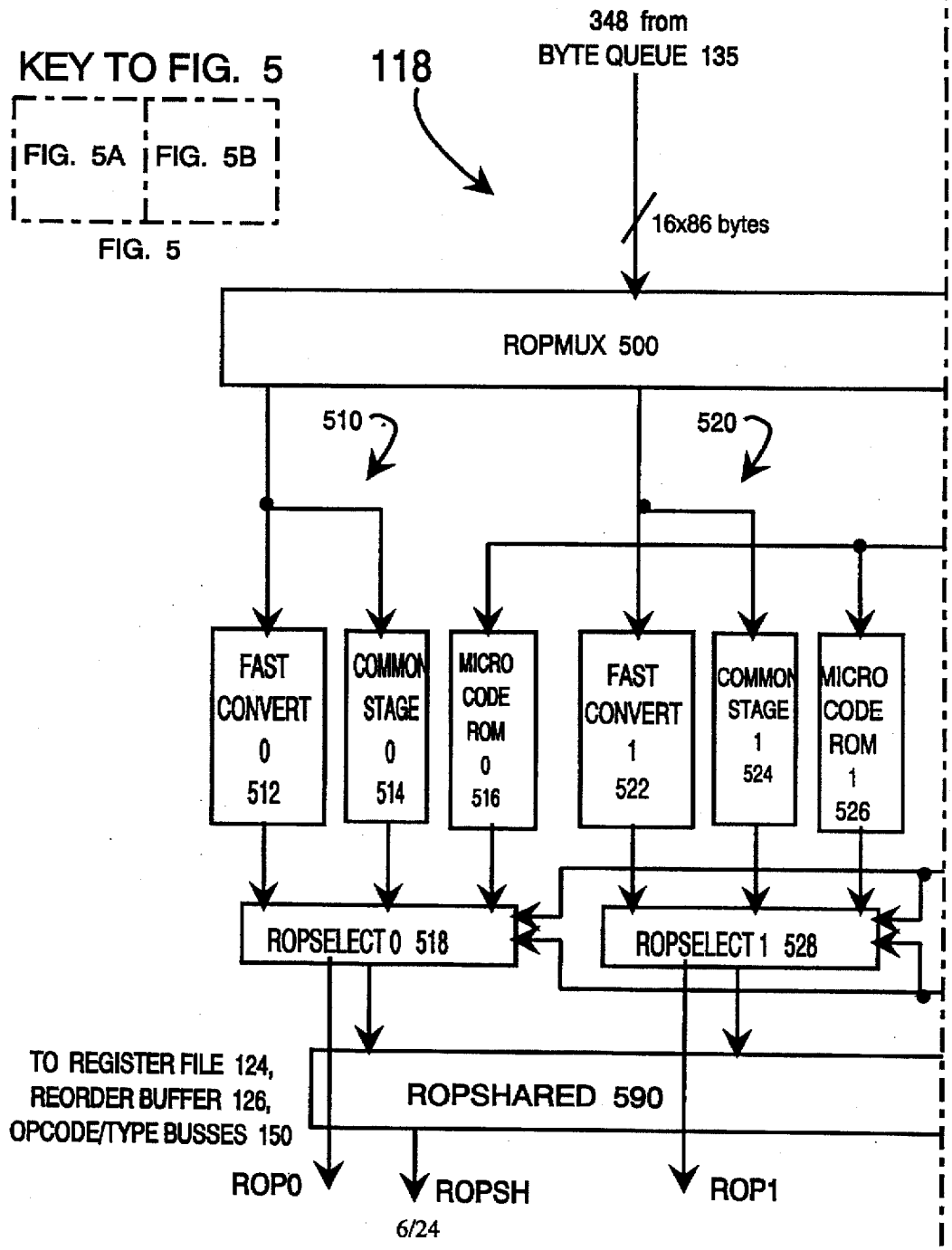

REGISTER FILE ARRAY 662

| BITS 8:7 BITS 6:3 | 00 <31:0> | 01 <40:0> | 10 <40:0> | | 11 <40:0> | |
|---|---|---|---|---|---|---|
| 0000 | EAX | — | (L) | FP0 | | (H) |
| 0001 | ECX | — | (L) | FP1 | | (H) |
| 0010 | EDX | — | (L) | FP2 | | (H) |
| 0011 | EBX | — | (L) | FP3 | | (H) |
| 0100 | ESP | — | (L) | FP4 | | (H) |
| 0101 | EBP | — | (L) | FP5 | | (H) |
| 0110 | ESI | — | (L) | FP6 | | (H) |
| 0111 | EDI | — | (L) | FP7 | | (H) |
| 1000 | ETMP0 | ETMP8 | (L) | FTMP0 | | (H) |
| 1001 | ETMP1 | ETMP9 | (L) | FTMP1 | | (H) |
| 1010 | ETMP2 | ETMP10 | (L) | FTMP2 | | (H) |
| 1011 | ETMP3 | ETMP11 | (L) | FTMP3 | | (H) |
| 1100 | ETMP4 | ETMP12 | (L) | FTMP4 | | (H) |
| 1101 | ETMP5 | ETMP13 | (L) | FTMP5 | | (H) |
| 1110 | ETMP6 | ETMP14 | (L) | FTMP6 | | (H) |
| 1111 | ETMP7 | ETMP15 | (L) | FTMP7 | | (H) |

700

<40:0>  <81:0>

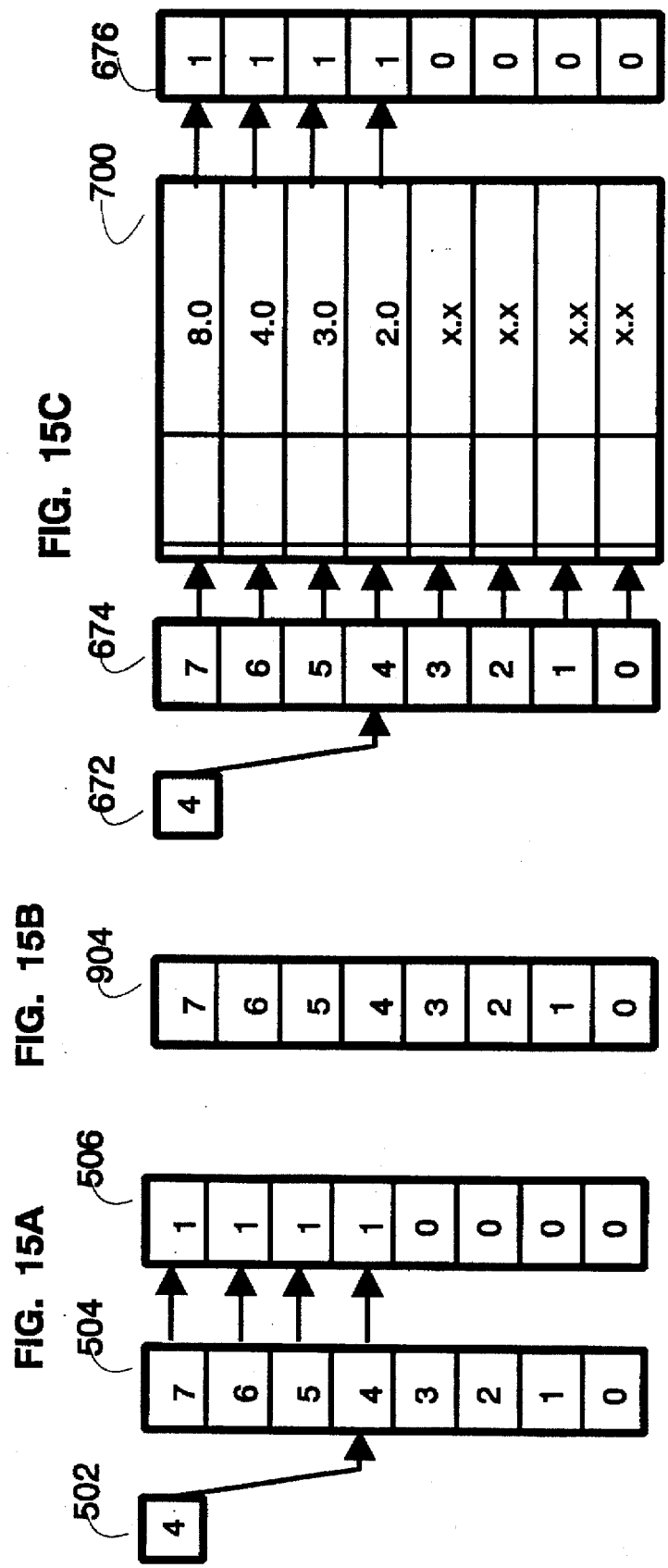

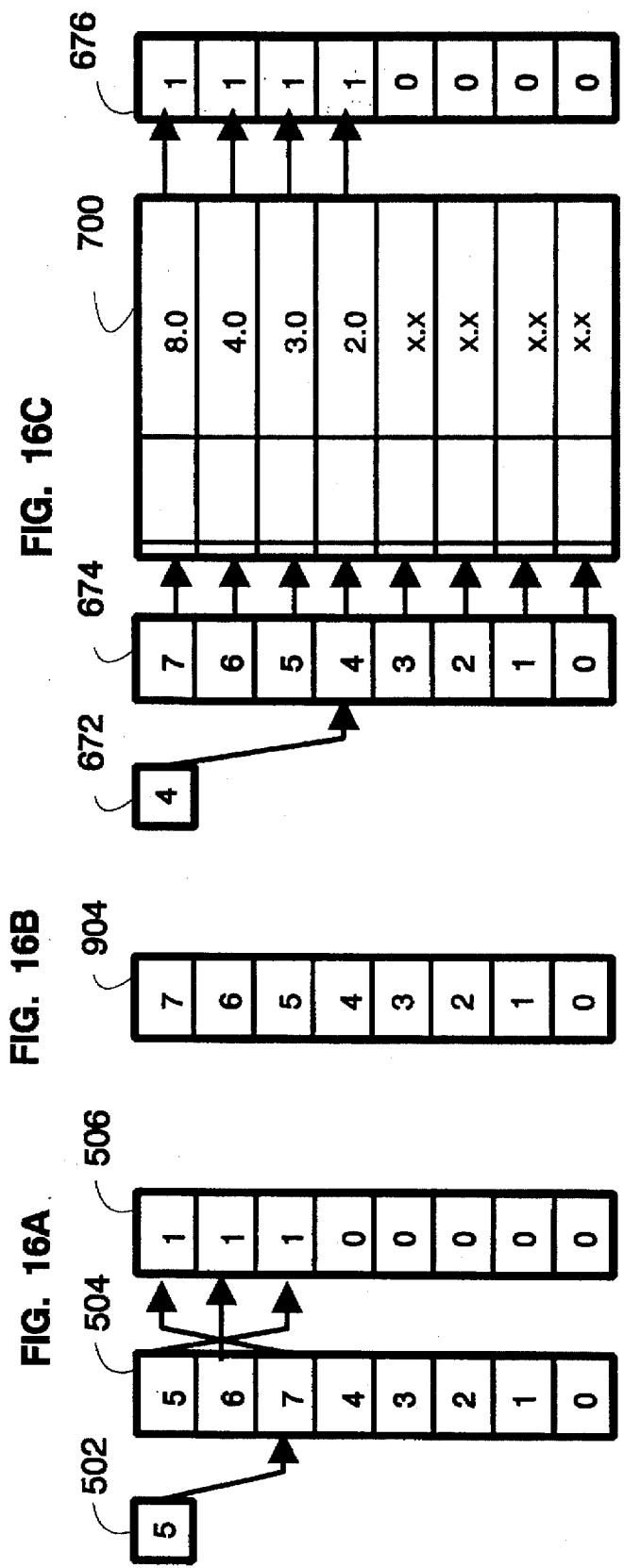

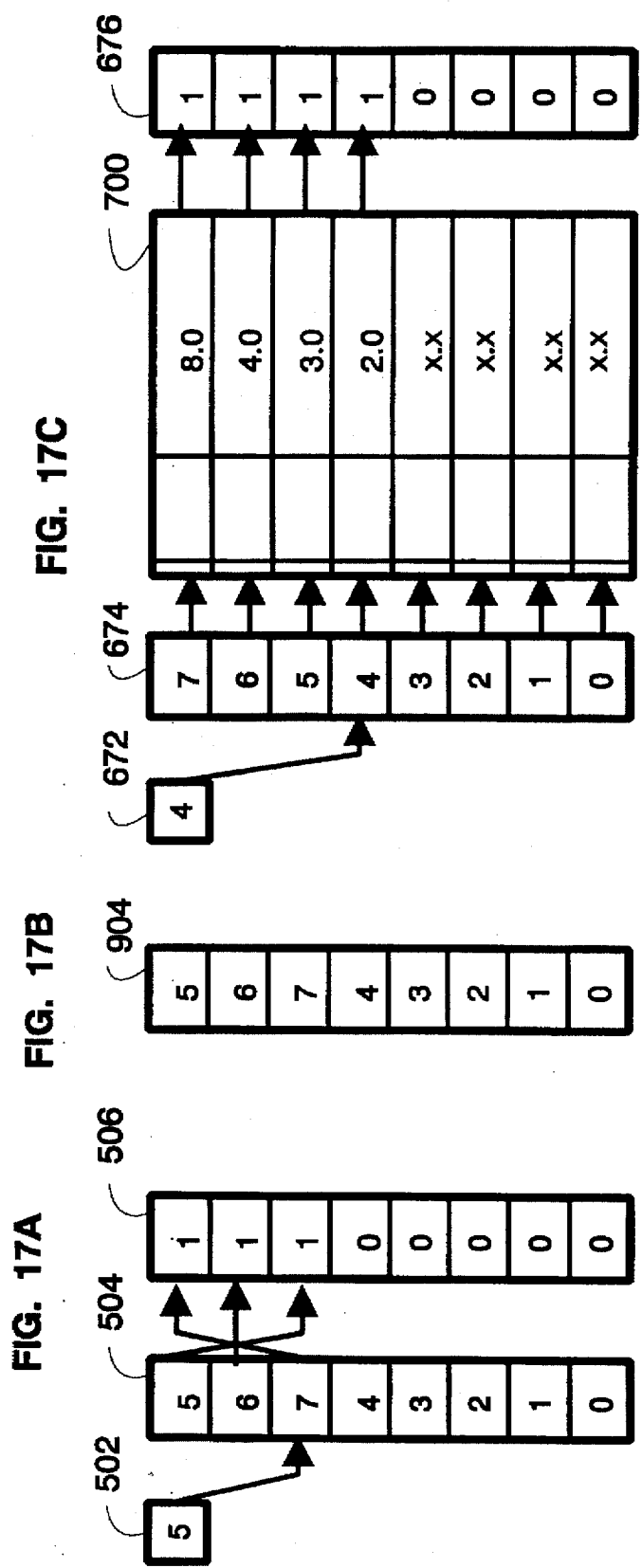

FLOATING POINT STACK AND EXCHANGE INSTRUCTION

BACKGROUND OF THE INVENTION

1. Field of the Invention

The present invention relates to a processor stack and, more particularly, to a stack and stack operating method for processors that engage in speculative execution of instructions.

2. Description of the Related Art

Processors generally process a single instruction of an instruction set in several steps. Early technology processors performed these steps serially. Advances in technology have led to pipelined-architecture processors, called scalar processors, which perform different steps of many instructions concurrently. A "superscalar" processor further improves performance by supporting concurrent execution of scalar instructions. In a superscalar processor, instruction conflicts and dependency conditions arise in which an issued instruction cannot be executed because data or resources are not available. For example, an issued instruction cannot execute when its input operands are dependent upon data calculated by other instructions that have not yet completed execution.

Superscalar processor performance is improved by continuing to decode instructions regardless of the ability to execute instructions immediately. Decoupling of instruction decoding and instruction execution requires a buffer, called a lookahead buffer, for storing dispatched instruction information used by the circuits, called functional units, which execute the instructions.

The buffer also improves the processor's performance of instruction sequences that include interspersed branch instructions. Branch instructions impair processor performance because instructions following the branch commonly must wait for a condition to become known before execution can proceed. A superscalar processor improves branching performance by "speculatively" executing instructions, which involves predicting the outcome of a branch condition and proceeding with subsequent instructions in accordance with the prediction. The buffer is implemented to maintain the processor's speculative state. When a misprediction occurs, the results of instructions following the mispredicted branch are discarded. A superscalar processor's performance is greatly enhanced by a rapid recovery from a branch misprediction and restart of an appropriate instruction sequence. Recovery methods cancel effects of improperly performed instructions. Restart procedures reestablish a correct instruction sequence.

One recovery and restart method, taught by Mike Johnson in *Superscalar Processor Design*, Englewood Cliffs, N.J., Prentice Hall, 1991, p. 92–97, employs a reorder buffer and a register file. The register file holds register values generated by retired operations—operations that are no longer speculative. The reorder buffer holds speculative results of operations—results of operations that are executed in a sequence following a predicted but unverified branch. The reorder buffer operates as a first-in-first-out queue. When an instruction is decoded, an entry is allocated at the tail of the reorder buffer. The entry holds information concerning the instruction and the result of the instruction when it becomes available. When an entry that has received its result value reaches the head of the reorder buffer, the operation is retired by writing its result to the register file. The reorder buffer is used by a processor during recovery after a branch misprediction to discard register values made by instructions that follow a mispredicted branch. Although a reorder buffer effectively restores registers following a mispredicted branch, other processor registers may need to be restored as well. For example, in a processor that employs a stack for managing data, the stack requires restoration. Stack restoration requires recovery of all stack elements, including array elements and pointers.

One example of a stack is the floating point unit (FPU) register stack of the Pentium™ microprocessor, available from Intel Corporation of Santa Clara, Calif. The FPU register stack is an array of eight multiple-bit numeric registers that stores extended real data. FPU instructions address the data registers relative to the top of the stack (TOS). A floating point exchange (FXCH) instruction in the Pentium™ microprocessor exchanges contents of the top of the stack with the contents of a specified stack element, for example a default element at the penultimate location of the stack relative to the TOS. The FXCH instruction is useful because Pentium™ floating point instructions generally require one source operand to be located at the top of the stack and, most frequently, the result of a FPU instruction is left at TOS. Most FPU instructions require access to the TOS, so it is desirable to manipulate data positions within the stack using the FXCH instruction.

The top of the stack is identified by the TOS pointer. Stack entries are pushed and popped by the execution of some floating point instructions and data load and store instructions. Since these instructions depend on programming of the processor, floating point overflows and underflows can occur and must be trapped, generating an exception condition. An exception condition, like a mispredicted branch, requires restoration of the speculative state of the processor.

One consequence of the FXCH instruction is that it introduces variability into the order of stack elements which complicates restoration of the stack following a mispredicted branch or exception.

In a superscalar processor, mispredicted branches and exceptions occur, making effective recovery and restart procedures desirable. What is sought are a stack and method of operating a stack for simply and rapidly restoring the state of a stack.

SUMMARY OF THE INVENTION

One embodiment of the present invention is a processor for concurrently performing multiple operations such as floating point calculation instructions, floating point stack exchanges and instructions that push or pop a floating point stack. The processor includes a floating point functional unit for executing calculations and a floating point stack for handling calculation results from the floating point functional unit. The stack includes a floating point stack array for storing calculation results from the floating point functional unit, a floating point stack pointer for specifying an element of the floating point stack array, and a floating point stack remap array for ordering floating point stack array elements addressed by the stack pointer.

Another embodiment of the present invention is a method of controlling a stack. The stack includes a stack memory array and a stack pointer in a processor for performing instructions including stack exchange instructions and instructions that push or pop a stack. The method includes the step of initializing the stack by setting the stack pointer to the top of the stack memory array and setting a stack remap array to address stack memory array elements in sequential order. Other steps of the method include decoding and dispatching instructions for execution, exchanging elements of the stack remap array in response to a stack exchange instruction and adjusting the stack pointer in response to an instruction that pushes or pops the stack.

A further embodiment of the present invention is a method for controlling a processor stack. The stack includes a stack memory array and a stack pointer. The method includes the steps of initializing the stack, which includes the substeps of setting the stack pointer and a lookahead stack pointer to the top of the stack memory array and setting a stack remap array and a lookahead remap array to address the stack memory array elements in sequential order. Additional steps of the method include decoding and dispatching instructions for execution, exchanging elements of the lookahead remap array in response to a dispatched stack exchange instruction and adjusting the lookahead stack pointer in response to a dispatched instruction that pushes or pops the stack. In response to a dispatched branch instruction, the method includes the steps of saving the lookahead remap array, predicting whether the branch is taken or not taken, determining whether the branch is predicted correctly or mispredicted and restoring the lookahead remap array to the saved value when the branch instruction is mispredicted. In addition, the method includes the step of retiring the instruction in its program order, including the substeps of replacing the stack remap array with the lookahead remap array in response to a retiring stack exchange instruction, and adjusting the stack pointer in response to a retiring instruction that pushes or pops the stack.

The various embodiments of the present invention include methods and apparatus for operating a data stack that accomplish simple and rapid recovery and restart procedures when a processor confronts a mispredicted branch or exception.

Specific applications of present invention are methods and apparatus for operating a floating point data stack that achieve simple and rapid recovery and restart procedures. The present invention provides an advantageous capability to execute floating point exchange instructions in parallel with floating point arithmetic instructions.

BRIEF DESCRIPTION OF THE DRAWINGS

The present invention is better understood and its advantages, objects and features made better apparent by reference to the following description, in conjunction with the accompanying drawings, in which like reference numbers identify like elements, and wherein:

FIGS. 15(A, B and C), 16(A, B and C), 17(A, B and C), and 18(A, B and C) depict registers, arrays and pointers for controlling the stack in the processor of FIG. 1, and their contents at respective first, second, third and fourth times;

DETAILED DESCRIPTION OF THE PREFERRED EMBODIMENT

Figure 1B:
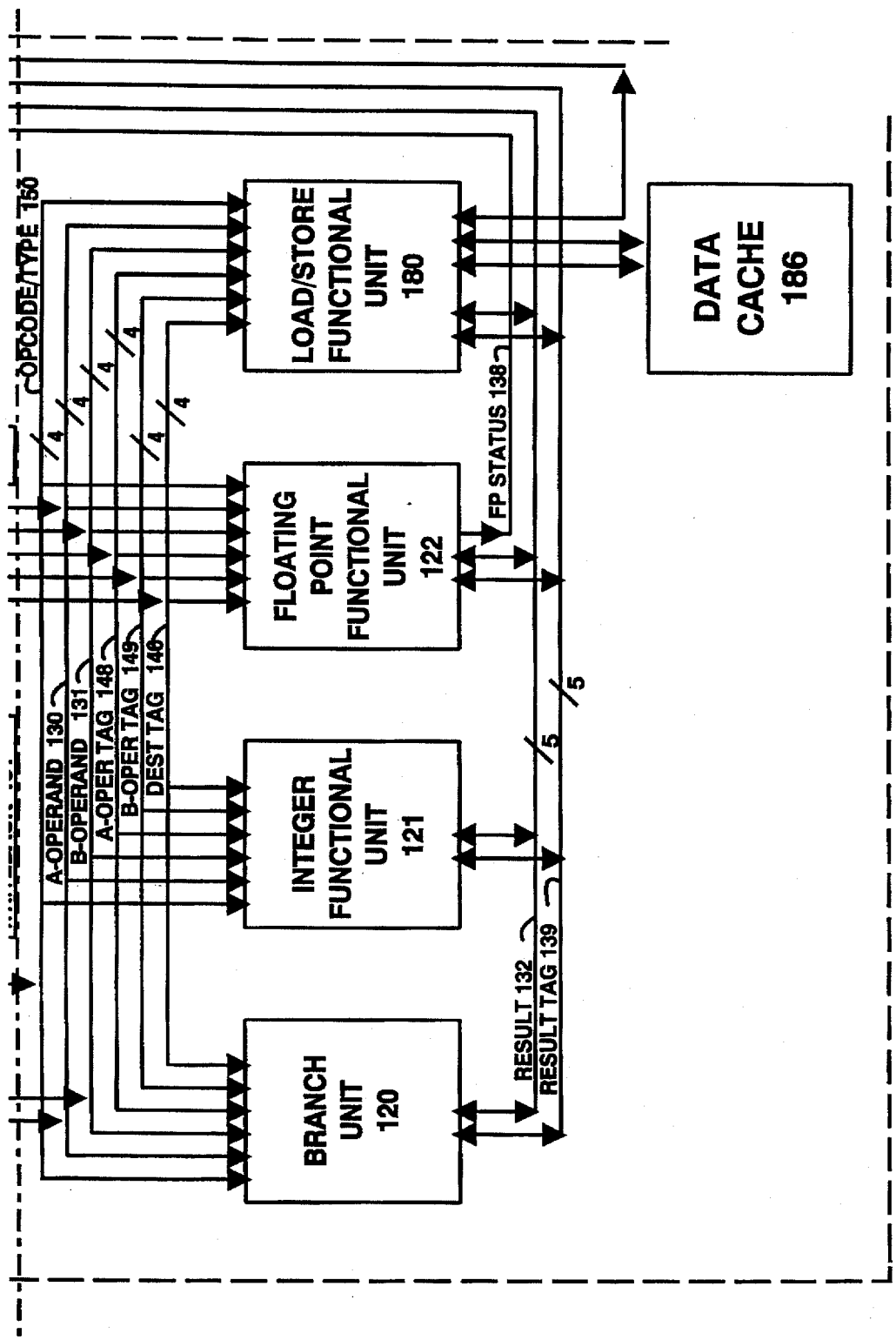
FIG. 1 is an architecture-level schematic block diagram of a processor depicting various primary blocks throughout which a data stack is distributed.

FIG. 1 depicts a superscalar processor 110 including an internal address and data bus 111 that communicates address, data, and control transfers among various functional blocks and an external memory 114. An instruction cache 116 parses and pre-decodes CISC instructions. A byte queue 135 transfers predecoded instructions to an instruction decoder 118, which maps the CISC instructions to respective sequences of instructions for RISC-like operations ("ROPs").

A suitable instruction cache 116 is described in further detail in U.S. patent application Ser. No. 08/145,905 filed on Oct. 29, 1993 (David B. Witt and Michael D. Goddard, "Pre-Decode Instruction Cache and Method Therefor Particularly Suitable for Variable Byte-Length Instructions", Attorney Docket Number M-2278). A suitable byte queue 135 is described in detail in U.S. patent application Ser. No. 08/145,902 filed on Oct. 29, 1993 (David B. Witt "Speculative Instruction Queue and Method Therefor Particularly Suitable for Variable Byte-Length Instructions", which is abandoned and continued as Ser. No. 08/311,286 filed Sep. 23, 1994. A suitable instruction decoder 118 is described in further detail in U.S. patent application Ser. No. 08/146,383 filed on Oct. 29, 1993 (David B. Witt and Michael D. Goddard "Superscalar Instruction Decoder", which is abandoned and continued as Ser. No. 08/628,389 filed Apr. 5, 1996. Each identified patent application is incorporated herein by reference in its entirety.

The instruction decoder 118 dispatches ROPs to functional blocks within the processor 110 over various busses. The processor 110 supports issue of up to four ROPs, communication of up to five ROP results and queuing of up to sixteen speculatively executed ROPs in a microprocessor cycle. Up to four sets of pointers to the A and B source operands and to a destination register are furnished by the instruction decoder 118 over respective A-operand pointers 136, B-operand pointers 137 and destination register pointers 143 to a register file 124 and a reorder buffer 126. The register file 124 and reorder buffer 126 in turn furnish appropriate source operands A and B to various functional units on four pairs of A-operand busses 130 and B-operand busses 131. Associated with the A and B-operand busses 130 and 131 are operand tag busses, including four pairs of A-operand tag busses 148 and B-operand tag busses 149. When data is unavailable for placement on an operand bus, a tag that identifies an entry in the reorder buffer 126 for receiving the data when it becomes available is loaded onto a corresponding operand tag bus. The operand and tag busses correspond to four ROP dispatch positions. The instruction decoder, in cooperation with the reorder buffer 126, specifies four destination tag busses 140 for identifying an entry in the reorder buffer 126 to receive results from the functional units after an ROP is executed. Functional units execute an ROP, copy the destination tag onto one of five result tag busses 139, and place a result on a corresponding one of five result busses 132 when the result is available. A functional unit accesses a result on result busses 132 when a corresponding tag on result tag busses 139 matches the operand tag of an ROP awaiting the result.

The instruction decoder 118 dispatches opcode information that accompanies the A and B source operand information via four opcode/type busses 150. Opcode information includes a type field which selects an appropriate one of the functional units and an opcode field which identifies the RISC opcode.

Processor 110 includes several functional units, such as a branch unit 120, an integer functional unit 121, a floating point functional unit 122 and a load/store functional unit 180. Integer functional unit 121 is presented in a generic sense and represents an arithmetic logic unit of various types or a shift unit. Branch unit 120 performs a branch prediction function which allows an adequate instruction-fetch rate in the presence of branches and is needed to achieve performance with multiple instruction issue. A suitable branch prediction system, including a branch unit 120 and instruction decoder 118, is described in further detail in Johnson, Superscalar Microprocessor Design, Prentice Hall, 1990, and in U.S. Pat. No. 5,136,697 (William M. Johnson "System for Reducing Delay for Execution Subsequent to Correctly Predicted Branch Instruction Using Fetch Information Stored with each Block of Instructions in Cache"), which is incorporated herein by reference in its entirety. Processor 110 is shown having a simple set of functional units to avoid undue complexity. Other combinations of integer and floating point units may be implemented, as desired.

Register file 124 is a physical storage memory including mapped CISC integer, floating point and temporary registers for holding intermediate calculations. Register file 124 is addressed by up to two register pointers of the A and B-operand pointers 136 and 137 for each of up to four concurrently dispatched ROPs and furnishes the values of the selected entries onto A and B operand busses 130 and 131 through eight read ports. Integers are stored 32-bit registers and floating point numbers are stored in 82-bit registers of the register file 124. Register file 124 receives results of executed and nonspeculative operations from reorder buffer 126 over four writeback busses 134, in a process known as retiring results.

Reorder buffer 126 is a circular FIFO for tracking the relative order of speculatively executed ROPs. Storage locations are dynamically allocated, using head and tail queue pointers, to retire results to register file 124 and to receive results from the functional units. When an instruction is decoded, its ROPs are allocated locations in the reorder buffer 126 for storing ROP information, including the result value when it becomes available and the destination-register number of the register file 124 into which the result is to be written. For an ROP having no dependencies, A and B operand busses 130 and 131 are driven from the register file 124. Floating point data is accessed using a stack so that, for a floating point ROP having no dependencies, the A and B operands and the destination register are not addressed directly in the manner of integer ROPS, but are designated by a stack pointer and remap register. The stack pointer and remap register, in combination, point to floating point registers in the register file 124. However, when an ROP has a dependency and refers to the renamed destination register to obtain the value considered to be stored therein, an entry is accessed within the reorder buffer 126. If a result is available therein, it is placed on the operand bus. If the result is unavailable, a tag identifying the reorder buffer entry is furnished on one of the A and B-operand tag busses 148 and 149. The result or tag is furnished to the functional units over the operand busses 130, 131 or operand tag busses 148, 149, respectively. For a floating point ROP, data dependent operands are accessed from reorder buffer 124 or are tagged in accordance with the stack pointer and remap register.

When results are obtained from completion of execution in the functional units 120, 121, 122 and 180, the results and their respective result tags are furnished to reorder buffer 126, as well as to the reservation stations of the functional units, over five bus-wide result busses 132 and result tag busses 139. Of the five result and result tag and status busses, four are general purpose busses for forwarding integer and floating point results to the reorder buffer. Additional fifth result and result tag and status busses are used to transfer information, that is not a forwarded result, from some of the functional units to the reorder buffer. For example, status information arising from a branch operation by the branch unit 120 is placed on the additional busses. A particular functional unit may interconnect with only a subset of the five results busses 132 and corresponding result tag busses 139.

A suitable RISC core, including a register file, reorder buffer and busses, is disclosed in U.S. patent application Ser. No. 08/146,382 filed on Oct. 29, 1993 (David B. Witt and William M. Johnson, "High Performance Superscalar Microprocessor," which is abandoned and continued as Ser. No. 08/501,243 filed Jul. 10, 1995, which is incorporated herein by reference in its entirety.

Figure 2:
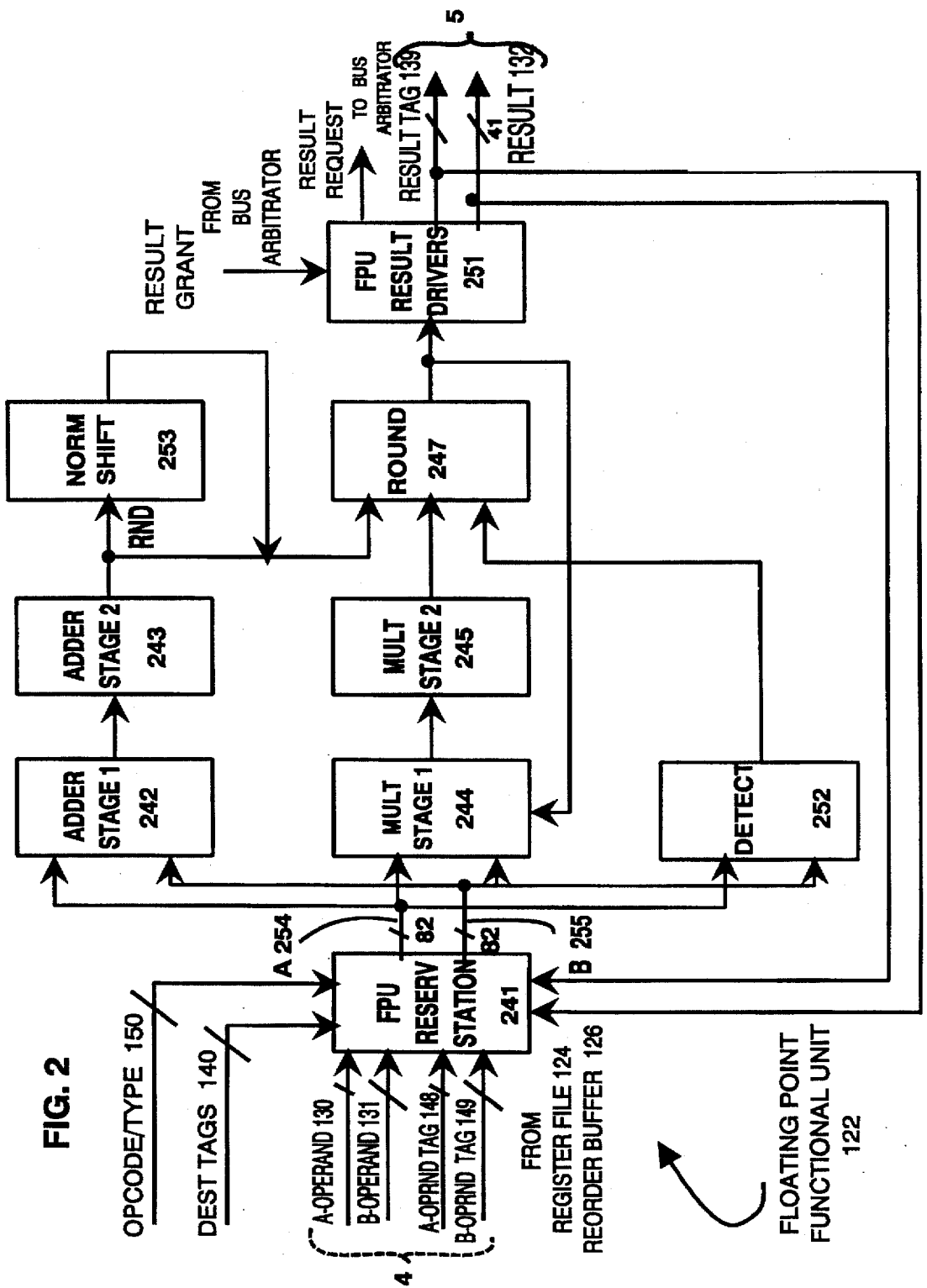
FIG. 2 is a schematic block diagram of a floating point functional unit in the FIG. 1 processor.

FIG. 2 depicts a schematic block diagram of the floating point unit 122, which performs arithmetic calculations using three pipelines. A first pipeline is an addition/subtraction pipeline that includes two adder stages 242 and 243 and a normalizing shifter stage 253. A second pipeline is a multiplication pipeline having two multiplication stages 244 and 245. A third pipeline includes a detect block 252. Floating point functional unit 122 also includes a shared floating point rounder 247 and FPU result drivers 251. A floating point reservation station 241 is connected to receive inputs from opcode/type busses 150, A and B-operand busses 130 and 131, result busses 132, result tag busses 139, A and B-operand tag busses 148 and 149 and destination tag busses 140. The reservation station 241 holds two entries, each of which includes storage for an 82-bit A operand and an 82-bit B operand, a destination result tag, an 8-bit opcode, a 4-bit A operand tag, a 4-bit B operand tag and status bits for indicating overflow and underflow conditions of the floating point stack. The reservation station 241 can accept one floating point operation, in the form of two ROPs, per clock cycle. Reservation station 241 drives 85-bit floating point A and B operand busses 254 and 255, each including 82-bit operands and three floating point calculation control bits.

Detect 252 generates exception signals when inputs to the floating point unit 122 meet certain conditions of defined invalidity. Invalid conditions occur when floating point stack overflow or underflow signals are set, the denominator operand in a division operation is equal to zero, or the values of source operands have values such that the generated result of an instruction is forced to zero or infinity. When an exception is generated due to the inputs to the floating point functional unit 122, the unit cancels remaining stages of the operation and places an exception signal on the result busses 132 so that the reorder buffer 126 initiates an exception response throughout the processor 110.

The floating point rounder 247 detects exceptions that result from execution of floating point ROPs. These exceptions include overflow or underflow of the floating point exponent value, or an inexact error during rounding. These errors are signalled to the reservation station 241.

The floating point stack is used by floating point instructions. Floating point instructions take their operands from the stack. Note that the floating point stack is somewhat distributed in the processor 110, and does not reside within and, in general, is structurally isolated from the floating point functional unit 122.

Reorder buffer 126 controls the management of data so that speculative data, including data in the floating point stack, is handled in a consistent manner through cooperation between various blocks in the processor 110, but generally independently of operations of the floating point functional unit 122. By providing data flow control, including dependency resolution, in the reorder buffer 126, other processor blocks including the FPU 122 are simplified. Control information that is used by the floating point unit 122 is limited to stack status bits, such as bits that indicate stack overflow or underflow conditions. This information is generated by the instruction decoder 118 and passed to floating point unit 122 upon ROP dispatch. When FPU 122 receives an overflow or underflow trap, it generates an exception signal.

Figure 3:
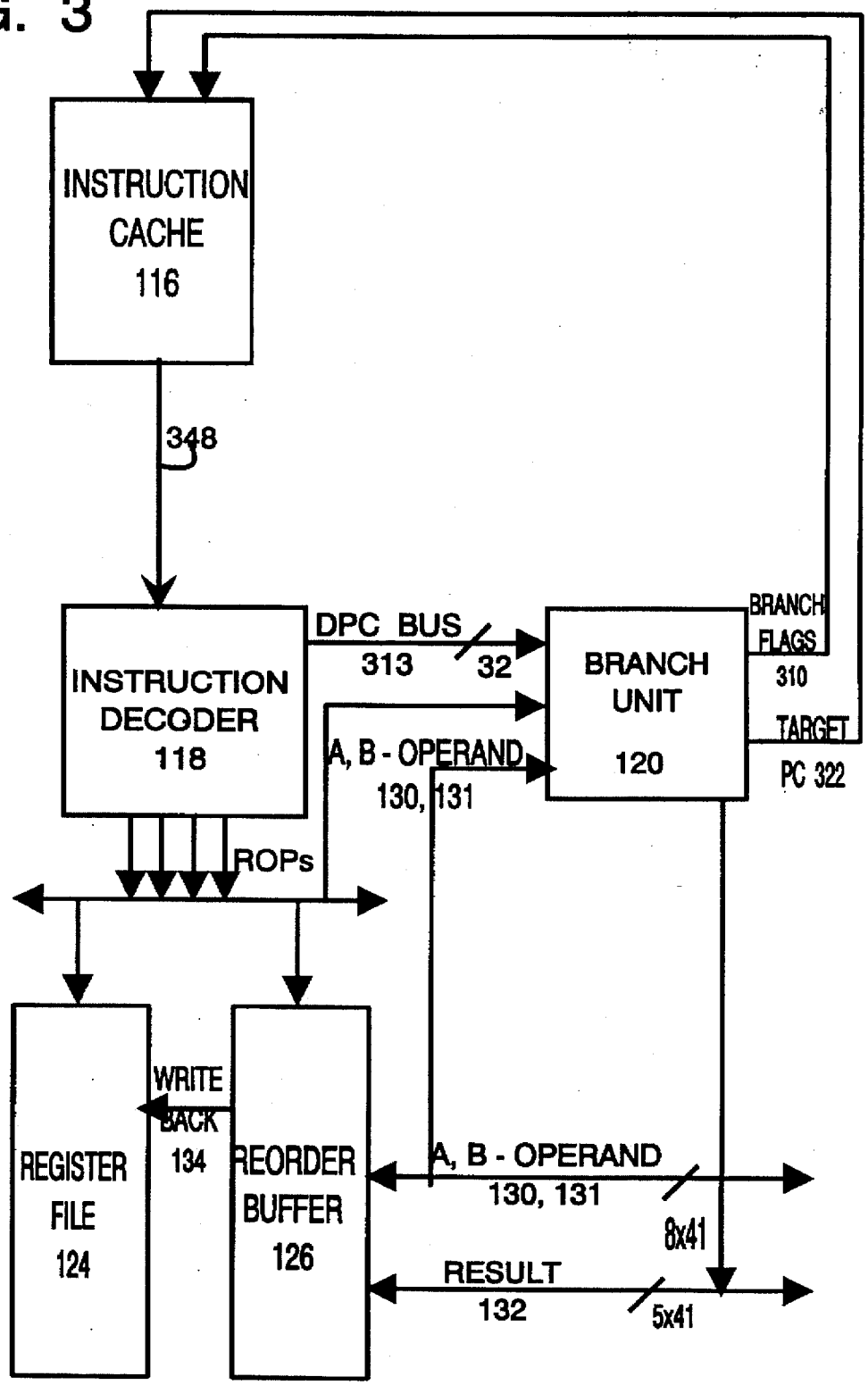
FIG. 3 is a block diagram illustrating functional blocks which support a floating point stack in the FIG. 1 processor.

FIG. 3 depicts the elements of processor 110 that incorporate the floating point stack, including various registers and arrays for controlling the stack and interconnecting data communication paths for operating the stack. FIG. 3 illustrates elements that implement branching functionality, since branch prediction and misprediction direct some aspects of stack functionality. The floating point stack includes storage and control circuits within instruction decoder 118, branch unit 120, reorder buffer 126 and register file 124. Notably, in this embodiment of the processor 110 the floating point functional unit 122 includes none of the structures of the floating point stack, allowing floating point instructions and floating point stack exchange instructions to be executed concurrently.

There are two types of instructions that affect the stack. A first type of stack-affecting instructions are floating point instructions. These instructions utilize data on the stack and return results to the stack. The first type of stack-affecting instructions are executed in the floating point unit 122. A second type of stack-affecting instruction is a floating point stack exchange (FXCH) instruction that exchanges elements of the stack. For various reasons, the FXCH instruction is executed in branch unit 120.

One reason the FXCH instruction is executed in branch unit 120 is that the order of stack elements is speculative, just as the value of data operands is speculative. Because a conditional branch may be mispredicted the order of stack elements, which is altered by a FXCH instruction following a mispredicted branch, must be restored. FXCH instructions are dispatched to branch unit 120 to save the order of the lookahead stack elements at the time a branch is dispatched. A second reason for executing an FXCH instruction in branch unit 120 is that processor 110 responds to a stack error, such as a stack underflow condition, through a resynchronization operation which is initiated by branch unit 120.

Instruction cache 116 and branch unit 120 cooperate to furnish a branch prediction capability using communication over a target PC bus 322 and branch flags 310. Instruction cache 116 supplies instructions to instruction decoder 118 over byte queue busses 348. Branch unit 120 includes registers which store data that correlate the lookahead state of the stack to a particular branch instruction. It is advantageous that FXCH instructions are dispatched to branch unit 120, rather than floating point unit 122, so that an FXCH and a floating point instruction can execute concurrently.

Instruction decoder 118 dispatches ROPs that correspond to the supplied instructions over various busses to various functional units, one of which is branch unit 120. As it dispatches ROPs, instruction decoder 118 drives A and B operand pointers 136 and 137 and destination pointers 143 to register file 124 and reorder buffer 126 to identify an ROP's source operands and destination register. Instruction decoder 118 sends a decode program counter (PC) to the branch unit 120 on a decode (DPC) bus 313. The instruction decoder 118 includes registers and arrays that store a lookahead state of the stack. For floating point ROPs, the registers and arrays of the lookahead stack are used to derive values of the pointers that are driven on operand pointer busses 136 and 137 and destination pointers 143 to access elements of register file 124 and reorder buffer 126. Nonspeculative integer and floating point data are both stored in register file 124. The floating point stack is in the form of registers within register file 124. Speculative integer and floating point data are stored in reorder buffer 126. Instruction decoder 118, using lookahead stack pointers and arrays, converts the designation of floating point operands from an identification of stack elements relative to the top of the stack to an identification of physical registers within register file 124. Once this conversion is accomplished, handling of speculative floating point operands in reorder buffer 126 is the same as the handling of integer operands. With respect to most aspects of data handling, processor 110 treats floating point data the same as integer data, avoiding requirements for special purpose logic.

Instruction decoder 118 resides at the beginning of the instruction-handling pipeline. It is advantageous to handle integer and floating point data in an equivalent and consistent manner through each stage of the pipeline. The lookahead state of the stack is determined at the time ROPs are decoded. Instruction decoder 118 controls updating of the lookahead stack pointer and remap array and converts the identification of floating point operands from a designation of positions on a stack to a designation of fixed registers. Instruction decoder 118, by virtue of its position at the beginning of the instruction pipeline, allows floating point and integer data to be handled in a consistent manner as early in the processor pipeline as possible.

Register file 124 has registers for holding the floating point stack and floating point stack control pointers and arrays including a top of stack pointer and a remap register. Thus, instruction decoder 118 holds the speculative state of the stack control elements, reorder buffer 126 holds any stack data that is in a speculative state and register file 124 stores nonspeculative floating point stack data and stack control elements.

Reorder buffer 126 controls processor recovery and restart procedures. Floating point stack recovery and restart functionality is accomplished by physically incorporating the stack into register file 124 and by employing reorder buffer 126 to control the writing of stack registers and arrays as operands are retired. Reorder buffer 126 controls timing of this updating because it tracks the speculative state of the processor 110, including the speculative state of the stack.

Figure 4:
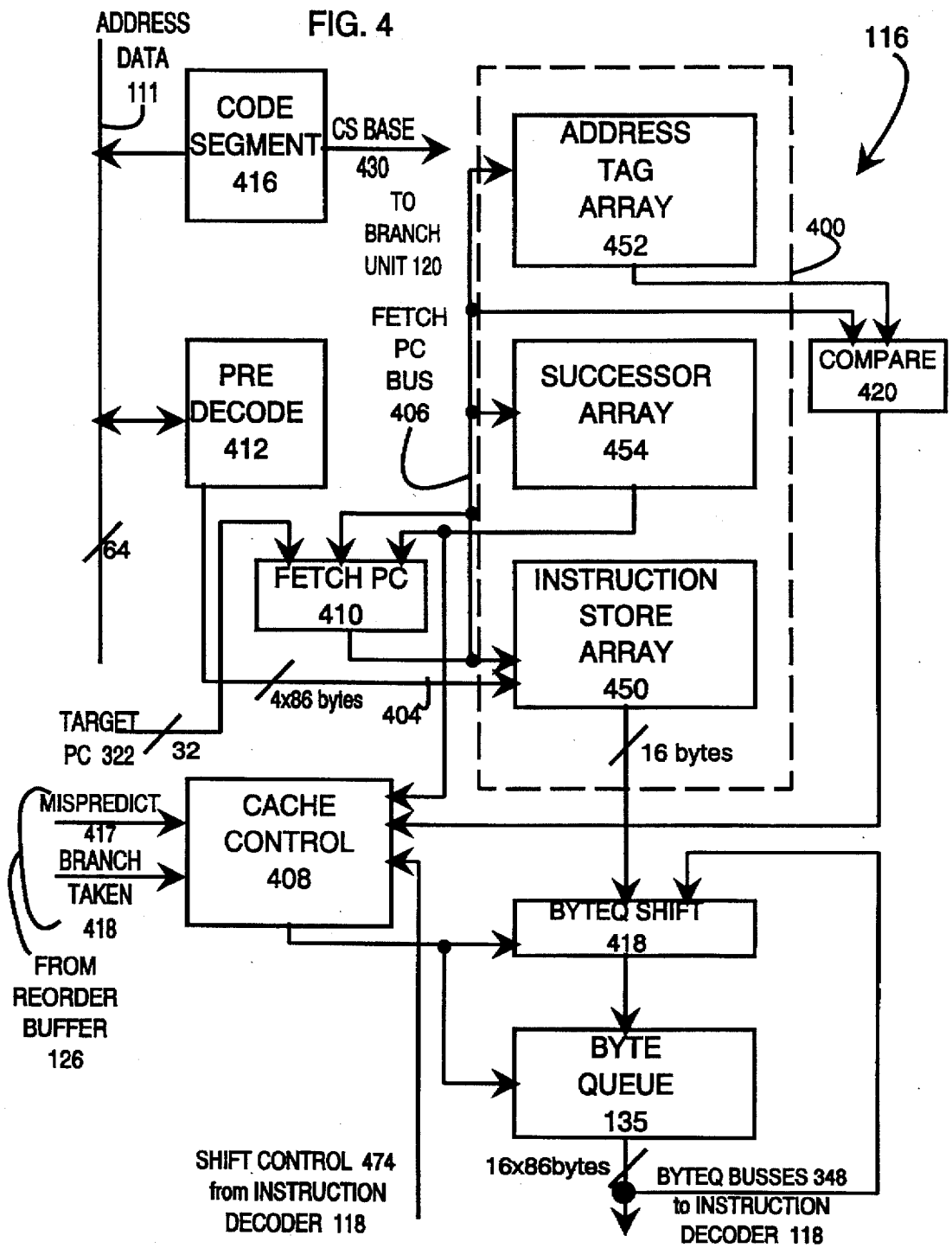
FIG. 4 is an architecture-level block diagram of an instruction cache which performs functions relating to the stack.

To better understand the branch prediction capability of the processor 110 and its impact on the floating point stack, consider the architecture of the instruction cache 116 shown in detail in FIG. 4. The instruction cache 116 predecodes prefetched x86 instruction bytes for instruction decoder 118. Instruction cache 116 includes a cache control 408, a fetch program counter (PC) 410, a fetch pc bus 406, a predecode 41a, a code segment 416, a byteq shift 418, a byte queue 135, and a cache array 400 which is organized into three arrays: an instruction store array 450, an address tag array 45a and a successor array 454.

Code segment register 416 holds copies of a code segment descriptor which is used to check validity of a requested memory access. Code segment 416 furnishes a code segment (CS) base value which is used in the branch unit 120 to convert logical addresses, which are addresses in the application's address space, to linear addresses, which are addresses in the address space of the processor 110. The CS base is conveyed to branch unit 120 over CS base lines 430. Predecode 412 receives pre-fetched x86 instruction bytes via an internal address/data bus 111, assigns predecode bits for each x86 instruction byte and writes the predecoded x86 instruction bytes into the instruction store array 450 via busses 404. Byte queue 135 holds predicted-executed instructions from the cache array 400 and presents up to 16 valid predecoded x86 instruction bytes to instruction decoder 118 on 16 busses 348. Byte queue shift 418 rotates, masks and shifts instructions on x86 boundaries. Shifts occur in response to a signal on shift control lines 474 when all ROPs of an x86 instruction are dispatched by instruction decoder 118. Cache control 408 generates control signals to manage instruction cache 116 operations.

The fetch PC, which is stored in register 410 and communicated via fetch pc bus 406, identifies instructions to be fetched during accesses of the three arrays of cache array 400. Middle-order fetch PC bits are a cache index which address an entry from each array for retrieval. High-order bits are an address tag which is compared to the addressed tag by compare 420 and retrieved from the address tag array 452. A match indicates a cache hit. Low-order bits are an offset which identifies the addressed byte of the addressed and retrieved entry from the instruction store array 450. Fetch PC 410, cache control 408, and cache array 400 cooperate to maintain and redirect the address conveyed on the fetch pc bus 406. Fetch PC register 410 updates its pointer from one cycle to the next, either by retaining the pointer value, incrementing the pointer, receiving a pointer via internal address/data bus 111 or loading a pointer from the target pc bus 322. The target pc is loaded into fetch PC register 410 by cache control 408 in response to a branch mispredict flag 417 of branch flags 310 which are received from the branch unit 120 when a branch instruction is executed and found to be mispredicted.

Address tag array 452 entries include an address tag for identifying cache hits, a valid bit for indicating validity of the address tag and byte-valid bits corresponding to each of the instruction store array 450 bytes for indicating whether the predecoded x86 instruction byte contains a valid x86 instruction byte and valid predecode bits.

Successor array 454, which supports branch prediction, has entries including a successor index, a successor valid bit (NSEQ) and a block branch index (BBI). NSEQ is asserted when the successor array addresses the instruction store array 450 and is not asserted when no branch in the instruction block is "predicted taken". BBI is defined only when NSEQ is asserted and designates the byte location within the current instruction block of the last instruction byte predicted executed. The successor index indicates the cache location of the first byte of the next predicted-executed instruction, starting at the target location of the speculative branch.

A branch instruction is performed through coordinated operations of instruction cache 116 and branch unit 120. For example, if instruction cache 120 predicts the branch as not-taken, instructions are fetched sequentially. If the branch is later taken upon execution by the branch unit 120, the prediction is incorrect and the branch unit 120 asserts the branch mispredict flag 417 and a branch taken flag 418. Branch unit 120 passes the correct target PC back to the instruction cache 116 on the target pc bus 322, where it is stored in the fetch PC register 410. In accordance with the value in fetch PC register 410, the instruction store array 450 provides an instruction stream beginning at the target pc address and begins refilling byte queue 135. The speculative slate in the ROB 126 and in the FP stack is flushed.

If instruction cache 120 predicts the branch as taken, the next instruction is nonsequential. A successor array 454 entry is allocated to the predicted taken branch instruction the NSEQ bit is asserted, the BBI is set to point to the last byte of the branch instruction, and the successor index is set to indicate the location within the instruction cache 116 of the target instruction. The successor index stores the index, column, and offset of the target instruction in the instruction store array 450, rather than the complete address. The fetch PC for the next instruction, which is nonsequential, is constructed by accessing the cache block using the index and column given by the successor index, and by concatenating the address tag high-order bits stored within that block to the index and offset bits from the previous successor index.

The constructed branch target passes from instruction cache 116 to instruction decoder 118 on fetch pc bus 406, and is used by instruction decoder 118 to maintain the decode PC as instructions are decoded.

Instruction decoder 118, as it dispatches a branch instruction to branch unit 120, sends the decode PC on decode pc busses 313 and a branch offset of the target on the operand busses 130. This information is used by branch unit 120 for branch instruction execution, and for verifying the prediction.

Figure 5B:
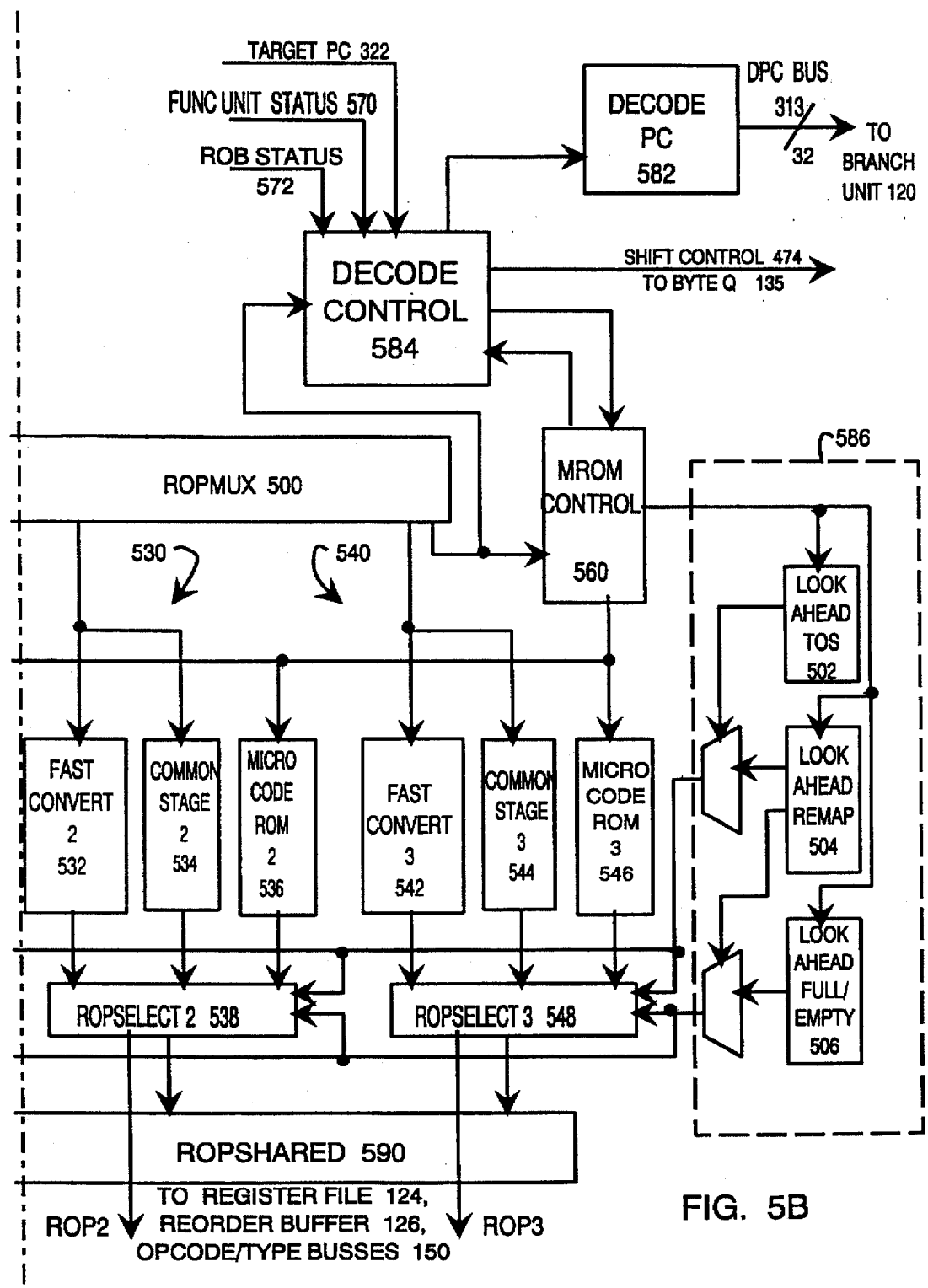
FIG. 5 is an architecture-level block diagram of an instruction decoder which includes functional blocks of the stack.

Instruction decoder 118 depicted in FIG. 5 receives predecoded x86 instruction bytes from byte queue 135, translates them into respective sequences of ROPs, and dispatches ROPs from multiple dispatch positions. For simple instructions, translation proceeds via a hardwired fast conversion path. Microcode ROM sequences handle infrequently used instructions and complex instructions which translate to more than three ROPs. The instruction decoder 118 selects and augments ROP information from either the fastpath or the microcode ROM and furnishes complete ROPs for execution by the functional units.

An ROP multiplexer 500 concurrently directs one or more pre-decoded x86 instructions in byte queue 135 to one or more available dispatch positions, beginning with the x86 instruction at the head of byte queue 135. ROP dispatch positions ROP 0, 1, 2 and 3 (510, 520, 530 and 540) include respective fast converters 0, 1, 2 and 3 (in order, 512, 522, 532, and 542); respective common stages 0, 1, 2 and 3 (514, 524, 534, and 544); and respective microcode ROMs 0, 1, 2 and 3 (516, 526, 536, and 546). Each dispatch position includes a common stage, a fast converter and an MROM. MROMs 516, 526, 536, and 546 are controlled by microcode ROM (MROM) controller 560.

The common stages handle pipelining and x86 instruction conversion operations that are common to fastpath and microcode ROM instructions, including handling of addressing modes.

MROM controller 560 performs control functions such as furnishing instruction types and opcodes, predicting the number of ROPs that fill a dispatch window, guiding shifting of byte queue 135 in accordance with a branch prediction of instruction cache 116, informing ROP multiplexer 500 of the number of ROPs to dispatch for the x86 instruction at the head of the byte queue 135, and accessing microcode and control ROM. MROM controller 560 controls ROP sequencing using two techniques: instruction-level sequence control and microbranch ROPs. Both instruction-level branches and microbranch ROPs are dispatched to branch unit 120 for verification and correction of mispredictions. The instruction-level sequence control field provides several capabilities: microcode subroutine call/return, unconditional branches to block-aligned MROM locations, processor state-based conditional branching, and end-of-sequence identifying. When an instruction-level sequence ROP is dispatched, an MROM address (rather than an instruction address) is sent for target formation or branch correction.

Microbranch ROPs furnish unconditional branching and conditional branching based on status flags 125. Microbranch ROPs are dispatched to branch unit 120 for execution. MROM controller 560 accepts microcode ROM entry points initiated by microbranch misprediction logic in branch unit 120. Microcode entry points generated by branch unit 120 are communicated to instruction decoder 118 over target pc bus 322. On a microbranch correction, branch unit 120 indicates to instruction decoder 118 via target pc bus 322 that the correction address is an MROM address rather than a PC.

ROP selects 0, 1, 2 and 3 (518, 528, 538 and 548) select outputs of either the fast converter or the MROM in combination with the outputs of the common stage and direct this information to register file 124, reorder buffer 126 and to various functional units.

ROP shared 590 dispatches information used by resources that are shared among all dispatch positions. ROP shared 590 furnishes ROP opcode encodings to the opcode/type busses 150 for dispatch to functional units.

Figure 10:
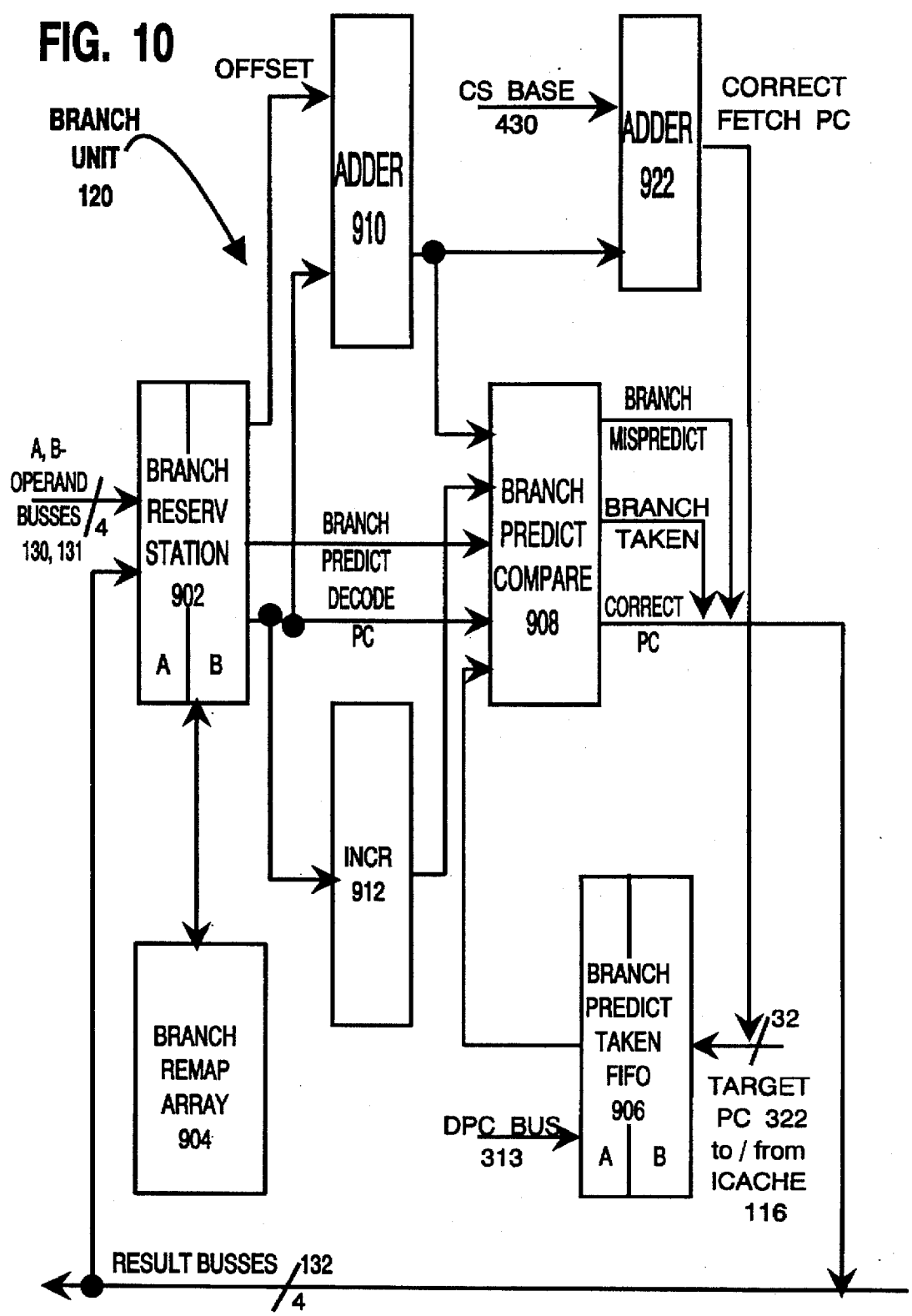
FIG. 10 is an architecture-level block diagram of a branch unit, including stack functional blocks.

Branch unit 120 receives the opcode and other ROP shared 590 outputs, including a 1-bit exchange underflow signal, a 2-bit cache column select identifier, a 1-bit branch predicted taken select signal, a 1-bit microbranch indicator, and a 1-bit signal that indicates whether branch unit 120 should write a predicted taken address on the target pc bus 322 to a branch predicted taken FIFO (906 of FIG. 10). Also, a 3-bit read flag pointer, which identifies an integer flag source operand, is set based on the position of the first undispatched ROP mapped to branch unit 120. If no ROP is mapped to branch unit 120, the read flag pointer is set to 0. A 2-bit usage indicator is encoded to set the dispatch position of the first undispatched ROP mapped to branch unit 120.

Instruction decoder 118 includes a decode PC 582, a decoder control 584 and a decoder stack 586. Decoder control 584 determines the number of ROPs to be issued based on the number of x86 instructions in byte queue 135, the status of the functional units (from lines 570) and the status of the reorder buffer (from lines 572). Decoder control 584 communicates the number of ROPs issued to byte queue 135 on shift control lines 474 so that byte queue 135 shifts by the number of fully executed x86 instructions and the beginning of byte queue 135 is always the start of the next full x86 instruction. When an exception or branch misprediction occurs, decoder control 584 prevents issue of additional ROPs until a new fetch PC is entered or an entry point is sent to the MROM for an exception micro-code routine.

Decode PC 582 tracks logical PCs of each x86 instruction from byte queue 135. When a nonsequential fetch is detected, the decode PC 582 contains a new pointer. When sequential instructions follow branches, decode PC 582 counts the number of x86 bytes in byte queue 135 between the start and end positions of the unbroken sequence and adds this number to the current PC to determine the next PC following the sequence. The decode PC is conveyed to branch unit 120 on DPC bus 313.

Decoder stack 586 holds a lookahead copy of various floating point stack pointer arrays and registers including a lookahead top of stack (TOS) pointer 502, a lookahead remap array 504 and a lookahead full/empty array 506. These arrays and pointers handle speculative modification of the floating point stack resulting from speculative issue of ROPs that affect the stack, including returning the stack to an appropriate state following a branch misprediction or exception.

Lookahead remap array 504 is an array of pointers, each designating one register of a stack array. In the illustrative embodiment of the stack, the lookahead remap array 504 is an array of eight 3-bit pointers, each identifying an element of a floating point stack array 700 within register file 124. Lookahead TOS 502 is a 3-bit pointer which selects one pointer of lookahead remap array 504. A lookahead full/empty array 506 is an array of single bits which designate whether a stack entry is full (1) or empty (0).

In a superscalar processor, that an operation is dispatched does not confirm that its execution is proper. Branches are predicted and some of the predictions are incorrect. Lookahead remap array 504, lookahead TOS 502 and lookahead full/empty array 506 are used to save a copy of the speculative state of the floating point stack, allowing accelerated recovery from mispredicted branches. For operations that modify the floating point stack, instruction decoder 118, as it decodes instructions, updates a future state of floating point stack array 700. When instruction decoder 118 decodes an instruction that increments or decrements the stack pointer, it updates the lookahead TOS 502. In a similar manner, when instruction decoder 118 decodes a floating point exchange instruction (FXCH), it adjusts the future state of lookahead remap array 504 by exchanging pointers as specified by the instruction. Since the state of the stack may change between any two branch instructions, stack information is preserved for every branch operation.

For a floating point ROP, lookahead TOS 502 and lookahead remap array 504, in combination, are used to determine the values of A and B-operand pointers 136 and 137 and destination register pointer 143. Accordingly, when a floating point ROP is decoded, its operands are designated, explicitly or implicitly, by locations of the floating point stack. For operands at the top of the stack, lookahead TOS 502 points to an element of the lookahead remap array 504 which, in turn, designates a position on the floating point stack array 700. This position corresponds to a floating point register in register file 124. This position is applied as A and B-operand pointers 136 and 137 and destination register pointer 143 for any operand or destination register at the top of the stack. In a similar manner, a pointer to any position relative to the top of the stack is determined by applying a pointer offset from the lookahead TOS 502 by a designated amount. Deriving the operand and destination pointers from the lookahead TOS 502 and remap array 504 in this manner allows the register file 124 and reorder buffer 126 to handle data, speculative and nonspeculative, in the same manner for both floating point and integer ROPs.

Figure 6:
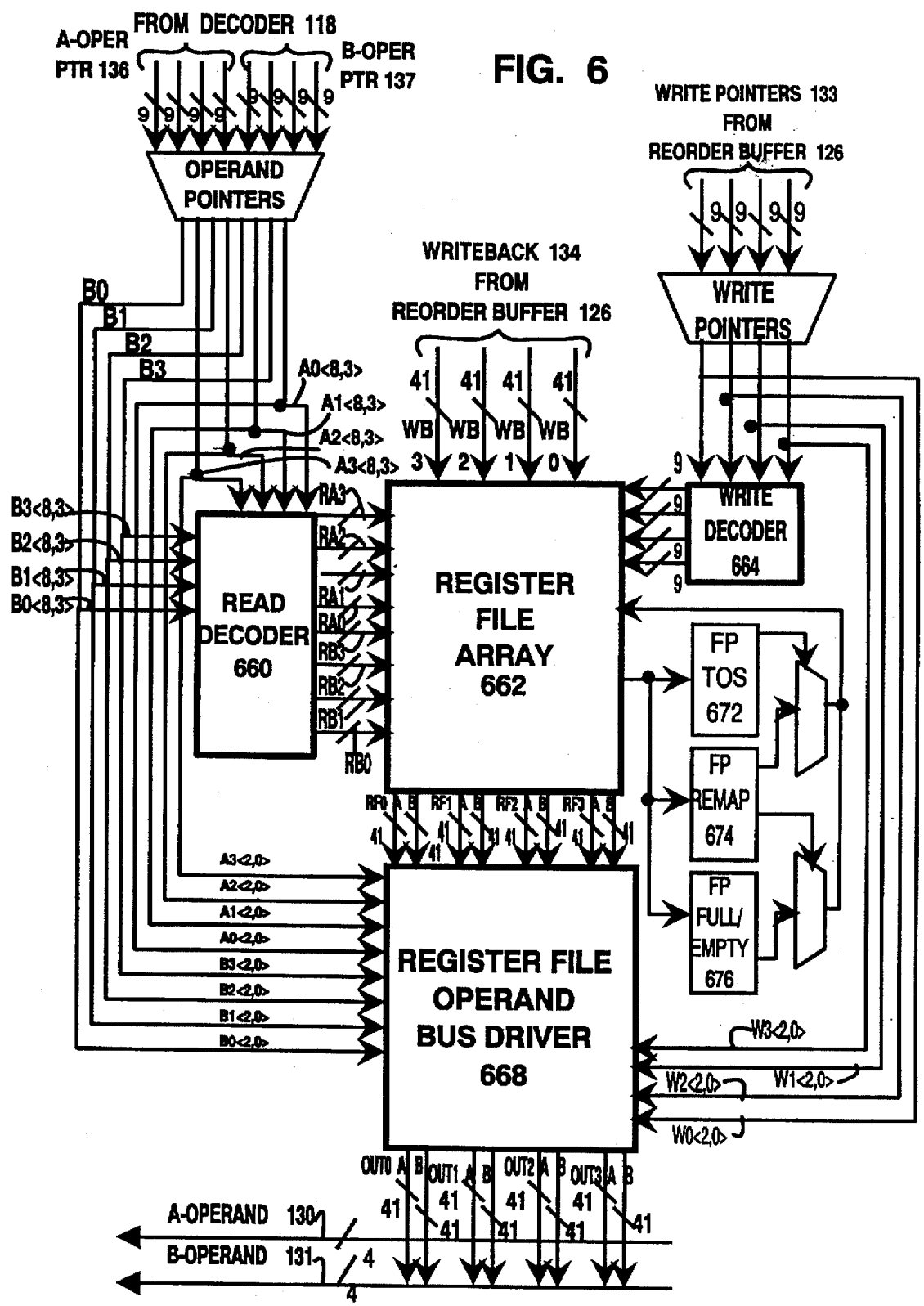
FIG. 6 is an architecture-level block diagram of a register file within the processor of FIG. 1.

Referring to FIG. 6, register file 124 includes a read decoder 660, a register file array 662, a write decoder 664, a register file control 666 and a register file operand bus driver 668. Read decoder 660 receives the A and B-operand pointers 136 and 137 to address the register file array 662 via four pairs of 64-bit A and B operand address signals RA0, RA1, RA2, RA3, RB0, RB1, RB2 and RB3. Register file array 662 receives result data from reorder buffer 126 via writeback busses 134. When a reorder buffer entry is retired in parallel with up to three other reorder buffer entries, result data for the entry is placed on one of writeback busses 134 and the destination pointer for that entry is placed on a write pointer 133 that corresponds to the writeback bus. Data on writeback busses 134 are sent to designated registers in register file array 662 in accordance with address signals on write pointers 133 that are applied to write decoder 664.

As it retires the particular ROPs that affect the various registers and arrays of the floating point stack, reorder buffer 126 drives data to various floating point stack registers within the register file 124, including a floating point remap array 674, a floating point top of stack (TOS) register 672 and a floating point full/empty array 676. Floating point stack array 700 (FIG. 70, which is also located within the register file 124, is an array of eight 82-bit numeric registers for storing extended real data. Each register includes one sign bit, a 19-bit exponent field and a 62-bit significand field. The floating point remap array 674 is an array of eight pointers, each being a pointer to a register of the floating point stack array 700. Floating point TOS 672 is a 3-bit pointer which designates a pointer into floating point remap array 674. The floating point full/empty array 676 is an array of single bits that indicate whether a location of the stack array is full (1) or empty (0), each corresponding to an element of the floating point stack array 700.

Figure 7:
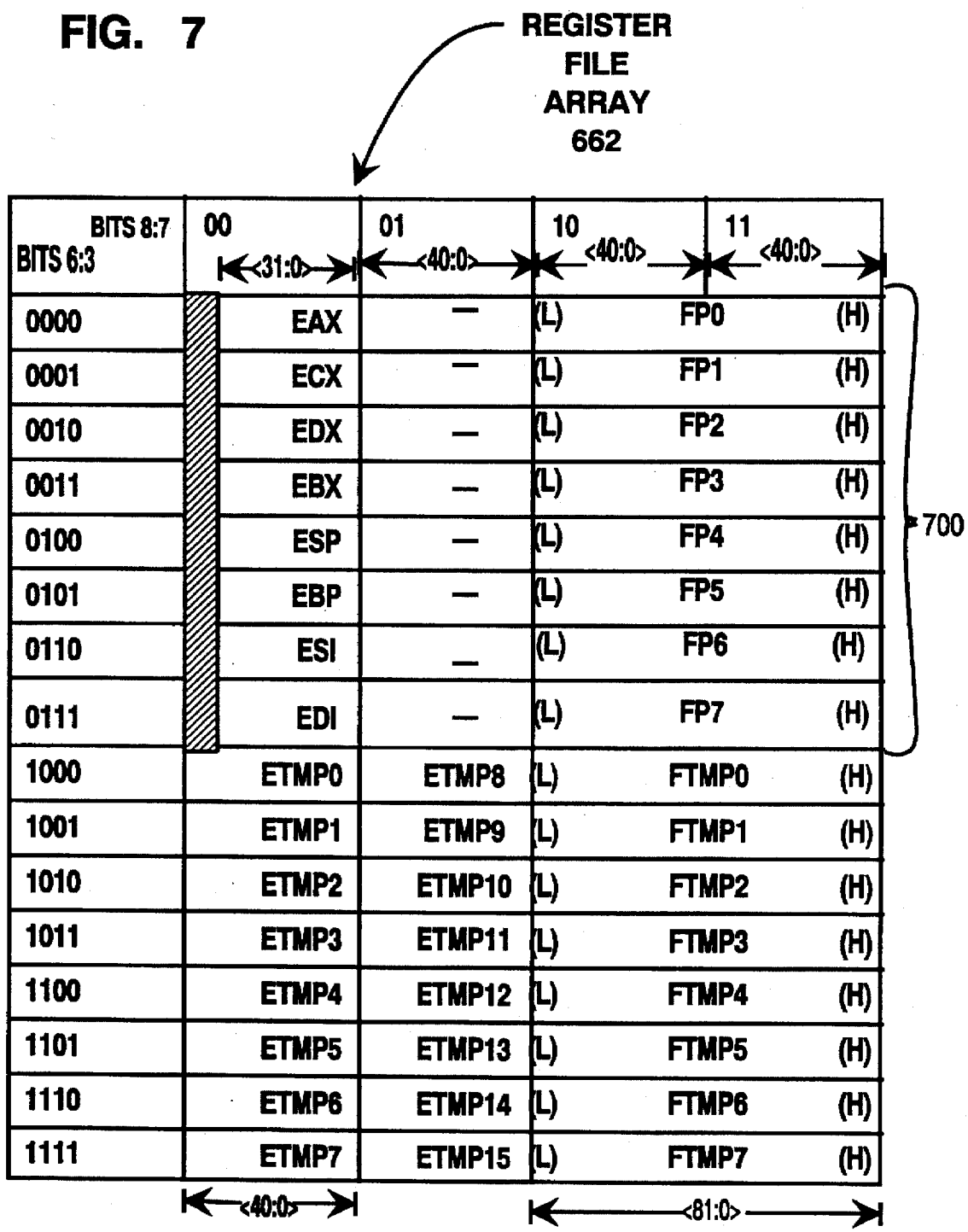
FIG. 7 is a pictorial representation illustrating a memory format in the register file shown in FIG. 6.

The register file array 662 includes multiple addressable registers for storing results operated upon and generated by processor functional units. FIG. 7 shows an exemplary register file array 662 with forty registers, including eight 32-bit integer registers (EAX, EBX, ECX, EDX, ESP, EBP, ESI and EDI), eight 82-bit floating point registers FP0 through FP7, sixteen 41-bit temporary integer registers ETMP0 through ETMP15 and eight 82-bit temporary floating point registers FTMP0 through FTMP7 which, in this embodiment, are mapped into the same physical register locations as the temporary integer registers ETMP0 through ETMP15. Floating point registers FP0 through FP7 are addressed as a floating point stack array 700, which are accessed using A and B-operand pointers 136 and 137 and destination register pointers 143 as derived using lookahead TOS 502 and lookahead remap array 504.

Figure 8:
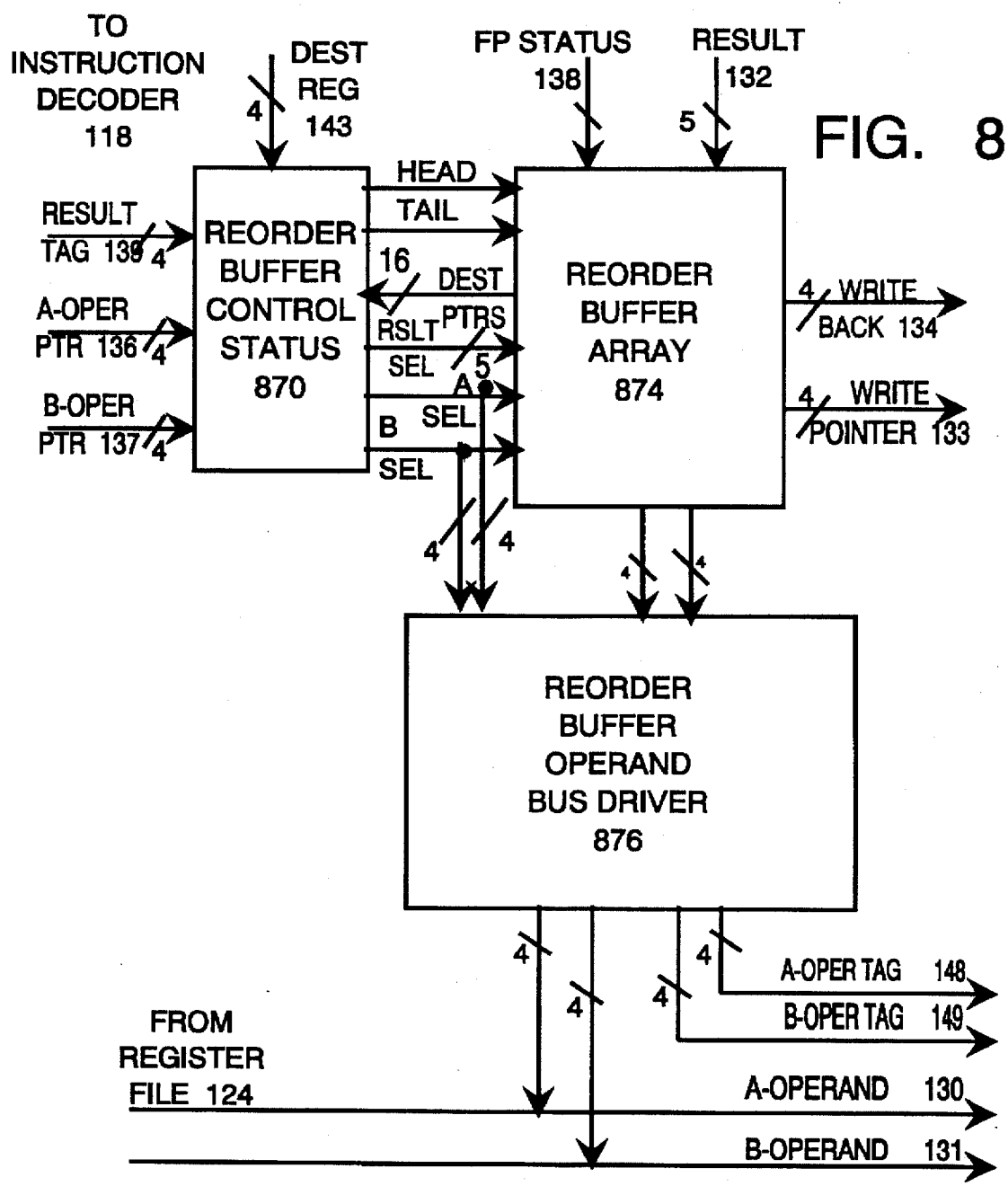
FIG. 8 is an architecture-level block diagram of a reorder buffer within the processor of FIG. 1.

Referring to FIG. 8, reorder buffer 126 includes a reorder buffer (ROB) control and status 870, a ROB array 874, and a ROB operand bus driver 876. ROB control and status 870 is connected to A and B-operand pointers 136 and 137 and destination pointer (DEST REG) busses 143 to receive inputs which identify an ROP's source and destination operands. ROB array 874 is a memory array controlled by ROB control and status 870. ROB array 874 is connected to result busses 132 to receive results from the functional units. Control signals, including a head, a tail, an A operand select, a B operand select and a result select signal, are conveyed from ROB control and status 870 to ROB array 874. These control signals select ROB array elements that are input from result busses 132 and output to writeback busses 134, write pointers 133, A and B-operand busses 130 and 131, and A and B-operand tag busses 148 and 149. Sixteen destination pointers, one for each reorder buffer array element, are applied from ROB array 874 to ROB control and status 870 to check for dependencies. A suitable dependency checking circuit is described in detail in U.S. patent application Ser. No. 08/233,568, filed Apr. 26, 1994 (Scott A. White, "A Range-Finding Circuit using Circular Carry Lookahead" now U.S. Pat. No. 5,689,693), is hereby incorporated by reference.

Figure 9:
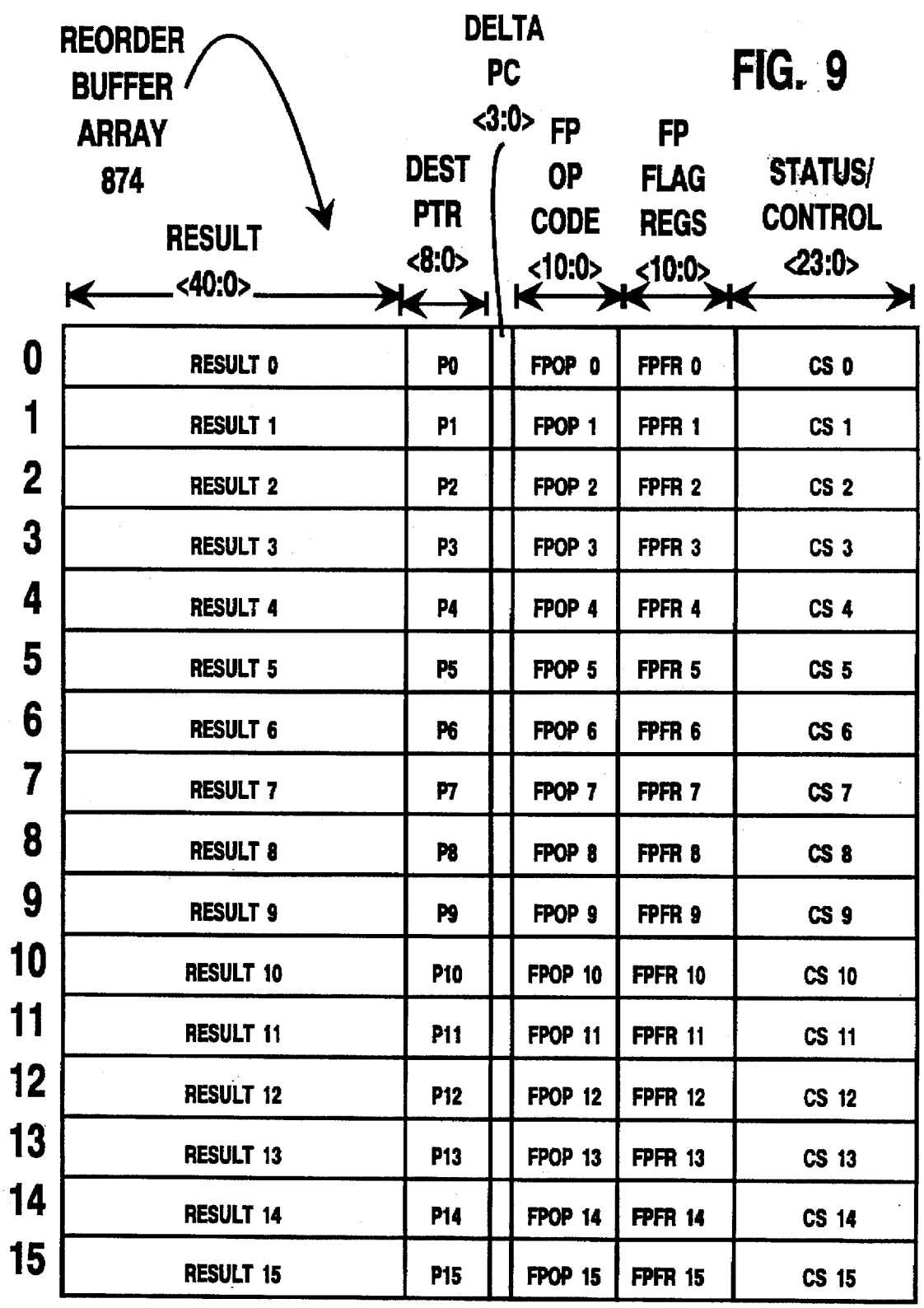
FIG. 9 is a pictorial illustration of a memory format within the reorder buffer of FIG. 8.

FIG. 9, in association with FIG. 8, depicts an example of a reorder buffer array 874 which includes sixteen entries, each having a 41-bit result field, a 9-bit destination pointer field, a 4-bit lower program counter field, an 11-bit floating point operation code field, an 11-bit floating point flag register field and a 24-bit control and status field. A 41-bit result field is furnished to store results received from the functional units. Two reorder buffer entries are used to store a floating point result. Integer results are stored in 32 of the 41 bits and the remaining nine bits are used to hold status flags. The destination pointer field (DEST PTR<8:0>) of each ROB array 874 entry designates a destination register in register file 124. The floating point operation code field stores a subset of the bits of an x86 floating point operation code corresponding to the instruction allocated to a reorder buffer entry. The floating point flag register field stores the state of the floating point flags resulting from a floating point operation. Floating point flags store information relating to precision, underflow, overflow, zero divide, denormalized operand and invalid operand errors detected by floating point functional unit 122. Control and status field includes bits which denote the status of the ROB entry, for example, an ALLOCATE bit, a BRANCH TAKEN bit, a MISPREDICT bit, a VALID bit, an EXIT bit, an UPDATE EIP bit and an EXCEPTION bit. The ALLOCATE bit designates whether a reorder buffer entry is allocated. The BRANCH TAKEN bit signals that the branch unit 120 has executed a branch instruction in which a branch was taken. The MISPREDICT bit indicates that a branch is incorrectly predicted. The VALID bit indicates that a result is valid and the instruction is complete. The EXIT bit specifies that a ROP is the last ROP in the sequence of ROPs of a particular x86 instruction and is used to trigger updating of an extended instruction pointer (EIP) register (not shown). The UPDATE EIP bit also designates that the EIP register is to be updated. The EXCEPTION bit signals that execution of an instruction has caused an exception or error condition.

In addition, the control and status field also includes STACK bits for updating the stack pointer. When instruction decoder 118 dispatches a floating point ROP, it also sends information for updating the stack to reorder buffer 126. This information includes a code designating the operation to perform on the stack pointer when the operation is retired. The stack may be pushed, popped, popped twice or left unchanged. Reorder buffer 126 holds this information in the STACK bits control and status field of an entry within the reorder buffer array 874 until execution of the operation is complete and the operands are retired.

When a functional unit completes execution of a stack-altering instruction and all previous program-order operations have been completed and their operands have been retired, reorder buffer 126 retires the operation if no errors, such as branch mispredictions or exceptions, have occurred. The stack is updated in accordance with the operations designated by the control field of the entry within the reorder buffer array 874. For example, floating point TOS 672 is incremented for a stack pop, incremented by two for a double pop, decremented for a push or left unchanged.

When a FXCH instruction is executed, branch unit 120 sends its copy of the lookahead remap array to reorder buffer 126 on one of the four result busses 132. On retirement, reorder buffer 126 drives, via one of writeback busses 134, this lookahead remap array 504 value to the floating point remap array 674, where it is stored. Additional lines (not shown) from reorder buffer 126 to floating point TOS 672 are used for updating the stack pointer. Register file array 662 includes a circuit (not shown) that writes zeros and ones to floating point full/empty array 676 as entries in floating point stack array 700 are updated. In this manner, a speculative floating point stack exchange becomes nonspeculative.

The branch unit 120 shown in FIG. 10 controls fetching of instructions that do not follow a sequential program order, including jump and call operations and return microroutines. Branch unit 120 includes a branch reservation station 902 which is connected to an adder 910 and an incrementer 912, branch predict compare logic 908 and a branch remap array 904. The branch remap array 904 is a part of the floating point stack. The branch unit 120 further includes a branch predict taken FIFO 906 that tracks branches that are "predicted taken". An entry of the branch predict taken FIFO 906 holds the cache location of a corresponding branch, and the PC of the predicted taken branch. The PC of the predicted taken branch is applied to the branch predict compare logic 906 to determine whether a branch is correctly predicted. The adder 910 and incrementer 912 calculate addresses for branches relative to the decode PC. When a branch is predicted taken by instruction cache 116, its nonsequential predicted target PC is driven to the branch predicted taken FIFO 906 and latched into the branch predicted taken FIFO 906, along with the location of the branch formed from the branching block's PC, the column, and the BBI. Branch unit 120 executes the corresponding branch ROP by determining the program counter, using the adder 910 or the incrementer 912. For example, if the branch is taken, the adder 910 is used to calculate the target program counter from the PC of the branch instruction and an offset parameter supplied as an operand via the operand busses 130. If a match occurs between the program counter updated by the branch unit 120 and the decode PC which is supplied from instruction decoder 118 on the DPC bus 313, branch unit 120 drives the result on result busses 132 to reorder buffer 126. The result includes the target PC and a status code indicating a match. If the branch is mispredicted, the correct target is driven to the instruction cache 116, redirecting the fetch PC.

Branch reservation station 902 is a multiple element FIFO array which receives ROP opcodes from instruction decoder 118 via opcode/type busses 150 and operand and result data from register file 124 and reorder buffer 126 via A and B-operand busses 130 and 131 and from result busses 132. Each reservation station element stores opcode information for one branch instruction. Multiple branch instructions may be held within its queue. Information received by branch reservation station 902 includes the decode PC, a branch prediction and a branch offset. The decode PC is communicated over the decode PC bus 313. The branch prediction is carried on branch predict lines. The offset is communicated via A and B-operand busses 130 and 131 through reorder buffer 126 to branch unit 120.

When instruction decoder 118 dispatches a branch instruction to branch unit 120, it communicates lookahead TOS 502 and lookahead full/empty array 506, which are stored in branch reservation station 902. Preferably lookahead remap array 504, lookahead full/empty array 506 and lookahead TOS 502 are available for handling by branch unit 120 so that the processor 110 functions in one manner when a prediction is correct and functions differently for a misprediction.

When a predicted taken branch instruction ROP is decoded and issued, the decode PC, offset and prediction are dispatched and held in branch unit 120 reservation station 902. If the predicted target counter matches the decode PC, a branch is predicted correctly and result information reflecting a correct prediction is returned correctly to reorder buffer 126. This information includes a target PC and a status code that indicates a match was achieved. If a branch is mispredicted, branch unit 120 drives the correct target both to instruction cache 116 and reorder buffer 126 and communicates an instruction block index to instruction cache 116. The index represents prediction information that is used to update the branch predicted taken FIFO 906. Reorder buffer 126 responds to a mispredicted branch by cancelling results of succeeding ROPs.

Branch unit 120 also converts logical addresses from instruction decoder 118 into linear addresses in cases of a misprediction. To do this, local copies of a code segment base pointer are supplied to branch unit 120 by code segment 416 of instruction cache 116. Branch unit 120 manages speculative updates of floating point stack circuits, including floating point TOS 672, floating point remap array 674 and floating point full/empty array 676 to implement floating point exchange instructions (FXCH) and accelerate floating point operations. Branch unit 120 achieves these objectives by preserving copies of the current stack status whenever a speculative branch occurs. Branch remap array 904 is copied from lookahead remap array 504 that is dispatched with each FXCH instruction. In other embodiments, branch remap array 904 is not absolutely necessary since it stores the same information as lookahead remap array 504. However, the illustrative embodiment communicates lookahead remap array 504 only when it is necessary, rather than for each branch instruction. Because lookahead remap array 504 only changes in response to FXCH instructions, in the described embodiment, lookahead remap array 504 is sent to branch unit 120 for FXCH requests alone.

Branch unit 120 responds to a misprediction by storing a correct copy of the stack pointer, the remap array and the full/empty array to the status that existed after the last successful branch. At completion of a branch ROP, branch unit 120 drives result busses 132 to communicate the branch prediction result. When the branch is predicted correctly, floating point TOS 672, floating point remap array 674 and floating point full/empty array 676 are saved without modification.

When a FXCH instruction executes normally with no branch mispredictions, exceptions, interrupts or traps, branch unit 120 stores the lookahead remap array 504 value sent by instruction decoder 118. Upon execution completion, branch unit 120 writes lookahead remap array 504 value to result busses 132. When the instruction is retired, reorder buffer 126 then commits to the exchange of registers by writing the lookahead remap array 504 to floating point remap array 674. However, when branch unit 120 detects a problem with the FXCH instruction, such as a stack underflow error, branch unit 120 is directed by reorder buffer 126 to initiate a resynchronization response, which restarts the processor at the point of the FXCH instruction. The resynchronization response is discussed in copending U.S. patent application Ser. No. 08/252,308, filed on even date herewith, entitled "RESYNCHRONIZATION OF A SUPERSCALAR PROCESSOR", S. A. White and M. D. Goddard, Attorney reference number M-2411, which is hereby incorporated by reference.

Branch unit 120 checks for stack errors prior to executing the FXCH instruction ROP. These errors include stack underflow conditions. When a stack underflow error is detected, branch unit 120 returns an error notification code to reorder buffer 126 which causes reorder buffer 126 to initiate a resynchronization response. This, in turn, restarts the processor at the FXCH instruction. However, the FXCH instruction that is invoked upon resynchronization following a stack underflow condition is different from other FXCH instructions. In particular, nonresynchronization FXCH instructions include a single FXCH ROP. The resynchronization FXCH instruction includes five ROPs, including two pairs of floating point add (FADD) ROPs and the single FXCH ROP. The two pairs of FADD ROPs respectively add zero to the two floating point registers that are exchanged in the FXCH instruction. A stack underflow error is caused by attempting to read an operand from an empty stack location. Floating point unit 122 determines whether the register is empty or full, in accordance with lookahead full/empty register 506. If an exchanged floating point register contains valid data, adding zero does not change the value of the data. Otherwise, when floating point unit 122 executes an FADD ROP and an exchanged floating point register is empty, floating point unit 122 responds either by initiating a trap response, if trapping is not masked, or by loading the register with a quiet not-a-number (QNaN) code.

Resynchronization following a stack underflow causes processor 110 to backtrack to the FXCH instruction, place the data in a known state, either valid data or a QNaN code, and to retry instructions following the FXCH, including any instructions that executed using invalid data.

Note, that every floating point instruction includes at least a pair of ROPs for the 41-bit operand busses 130 and 131 and the 41-bit result busses 132 to accommodate 82-bit floating point data.

When a branch is mispredicted, branch remap array 904 and the top-of-stack pointer and full/empty array stored in reservation station 902 for the mispredicted branch describe the state of the stack prior to the mispredicted branch. Branch unit 120 writes the locally stored remap and TOS values to lookahead remap array 504 and lookahead TOS 502 within instruction decoder 118 to return the state of the stack to that in effect preceding the mispredicted branch. Branch unit 120, rather than another functional unit, tests and recovers the stack because it alone detects mispredictions.

When processor 110 detects an exception condition, reorder buffer 126 achieves recovery by flushing its entries so that execution is resumed in a known state. Reorder buffer control 870 executes a similar recovery operation for the stack. Upon an exception, reorder buffer 126 writes floating point remap array 674 to lookahead remap array 504, floating point TOS 27 to lookahead TOS 502, and floating point full/empty array 676 to lookahead full/empty array 506.

The processor 110 executes floating point exchanges in parallel with floating point arithmetic instructions because the floating point stack is implemented outside of the FPU. For this reason, floating point stack component circuits are incorporated into units other than the floating point unit. Thus, lookahead remap array 504 and lookahead TOS 502 are incorporated into instruction decoder 118. Floating point TOS 672, floating point remap array 674 and floating point stack array 700 are placed within register file 124. Branch unit 120 furnishes branch remap array 904. Likewise, the FXCH instruction is executed within the branch unit 120 rather than a floating point unit to promote parallel instruction processing.

Figure 11:
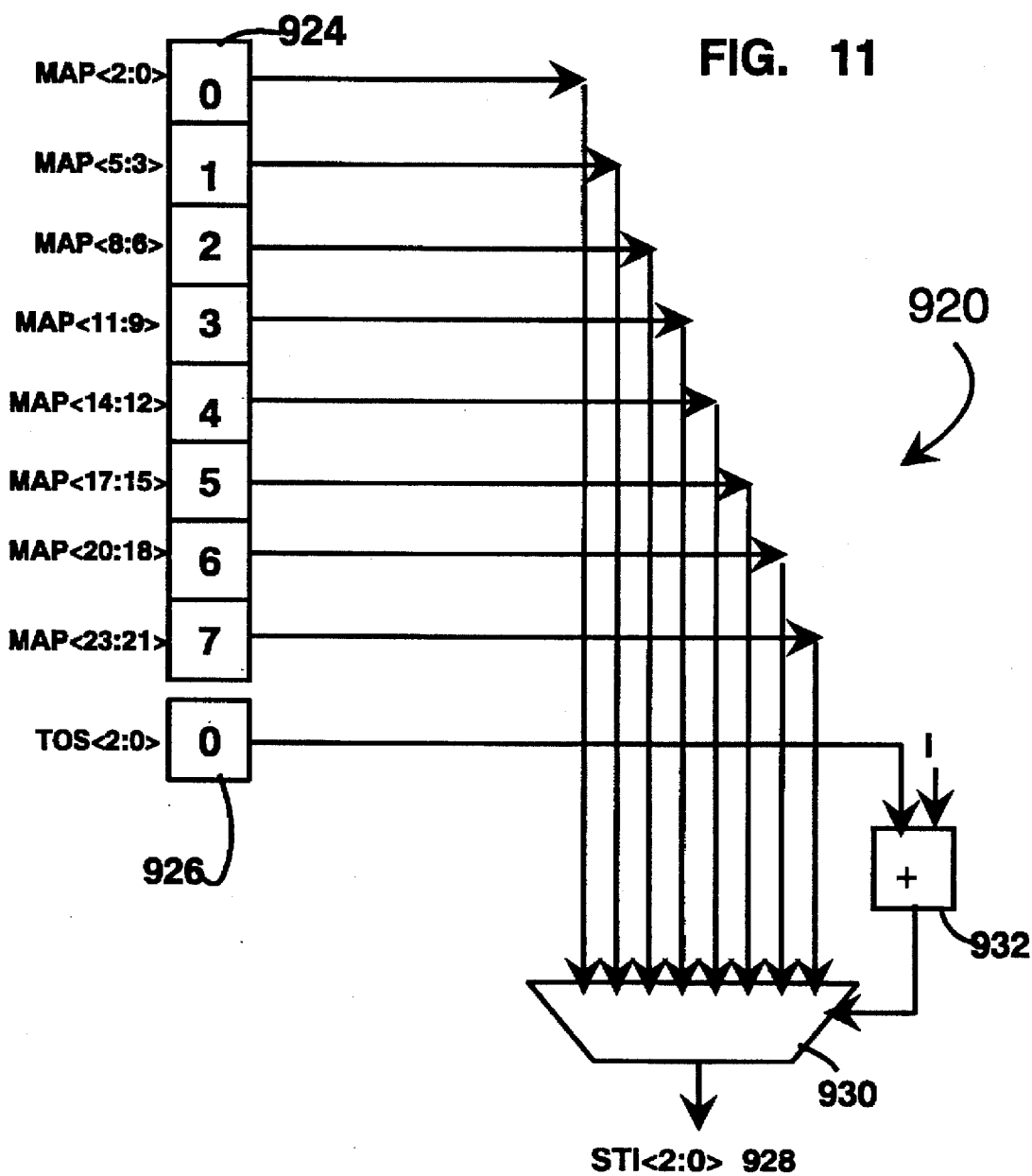
FIGS. 11, 12, 13 and 14 depict diagrams of instruction decoder functional blocks showing interconnections of lookahead stack functional blocks.
Figure 12:
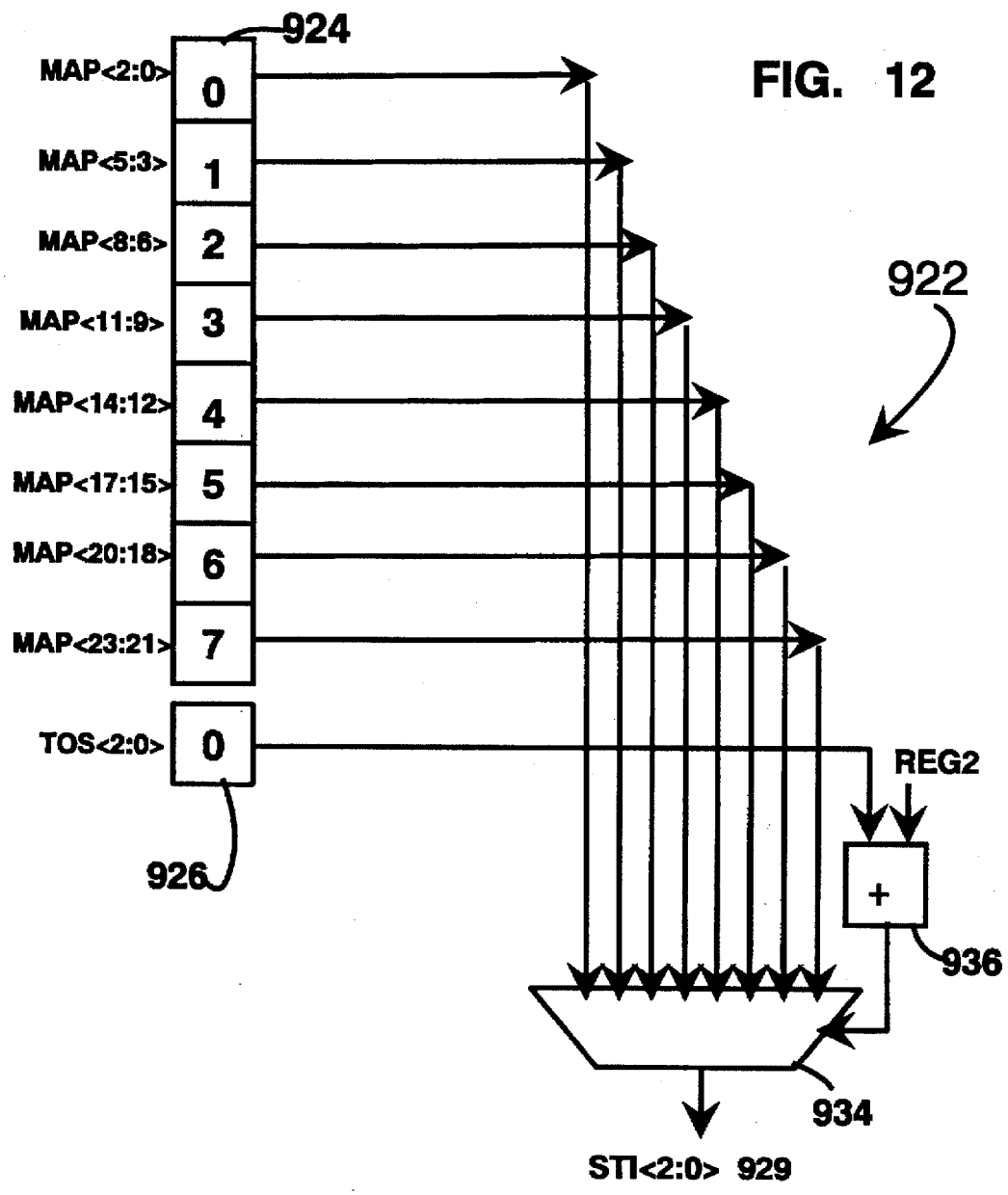

FIGS. 11 and 12 depict stack circuits, respectively 920 and 922, for deriving stack select signals, respectively STi<2:0> 928 and STI<2:0> 929, which select a stack entry according to a remap array MAP<23:0> 924 and a top of stack pointer TOS<2:0> 926. A multiplexer 930 and an adder 932 of the stack circuit 920 are duplicated four times in the instruction decoder 118 to furnish the lookahead remap array 504 and the lookahead TOS 502 for each of the four dispatch positions. The lookahead remap array 504 corresponds to MAP<23:0> 924. The lookahead TOS 502 corresponds to TOS<2:0> 926. One stack circuit 920 also is included in the register file 124 to furnish the floating point remap array 674, which corresponds to MAP<23:0> 924, and the floating point TOS 672, which corresponds to TOS<2:0> 926.

Similarly, a multiplexer 934 and an adder 936 of the stack circuit 922 is included in the instruction decoder 118 to derive the stack select signal STI<2:0> 929, which is a lookahead stack select signal. Stack circuit 922 is shared between the four decoder dispatch positions. The multiplexer 934 and adder 936 of the stack circuit 922 is included in the register file 124 to derive the stack select signal STI<2:0> 929, which is a floating point stack select signal.

The floating point stack select signal corresponding to STi<2:0> 928 or STI<2:0> 929 sets bits <5:3> which address the register file array 662 of FIG. 7. Thus, a floating point instruction selects an entry on the stack by designating its position relative to the top of the stack. The stack circuit 920 or 922 accordingly derives STi<2:0> 928 or STI<2:0> 929 to address the register file array 662. Floating point operands are driven onto the operand busses 130 and 131 by setting register file address bits <8:6> to "100" to access the low-order 41-bits and by setting the register file address bits <8:6> to "110" to access the high-order 41-bits of the floating point number. The STi<2:0> 928 or STI<2:0> 929 signals are also applied to the reorder buffer 126 to test for floating point data dependencies so that speculative execution and forwarding is accomplished for floating point ROPs.

The eight pointers of the lookahead remap array 504 are configured within a single 24-bit register MAP<23:0> 924 into a series of concatenated three-bit registers MAP<2:0> through MAP<23:21>. Similarly, the eight pointers of the floating point remap array 674 are configured within a single 24-bit register MAP<23:0> 924. Lookahead TOS 502 and floating point TOS<2:0> are each depicted by the 3-bit pointer TOS<2:0> 926. Contents of MAP<23:0> and TOS<2:0> shown in FIGS. 11 and 12 represent the initial condition of a stack.

Data in the 3-bit MAP registers, (MAP<2:0> . . . MAP<23:21> 924), are applied to an 8-way multiplexer 930 to generate 3-bit remapped stack signals STi<2:0>, where i selects one of the eight stack positions 0 through 7 relative to the top of the stack. ST0<2:0> identifies the remapped entry of a stack at the top of the stack, in which TOS<2:0> 926 is equal to zero. STi<2:0> identifies the remapped stack entry in the location following the entry at the top of the stack. Adder 932 adds 1 to the TOS<2:0> pointer to select STi<2:0> on multiplexer 930. For an increasing pointer i, STi<2:0> addresses additional stack elements sequentially in a circular manner so that a pointer beyond the physical limit (7) of the stack wraps to a lower stack address (0). ST7<2:0> is the element of remap array 924 in the location preceding the element addressed by TOS<2:0> 926.

Some x86 instructions designate an operation that acts upon a particular stack element. For example, any of the eight stack elements can be designated using REG2, which is derived from the modrm byte of an instruction, to define a stack element which is utilized by an ROP. In FIG. 12, instruction decoder 118 or register file 124 selects a remapped stack entry STI<2:0> designated by the sum of the TOS<2:0> 926 and REG2. Adder 936 adds the pointer values and applies the sum to a multiplexer 934 to derive STI<2:0> 929.

Figure 13:
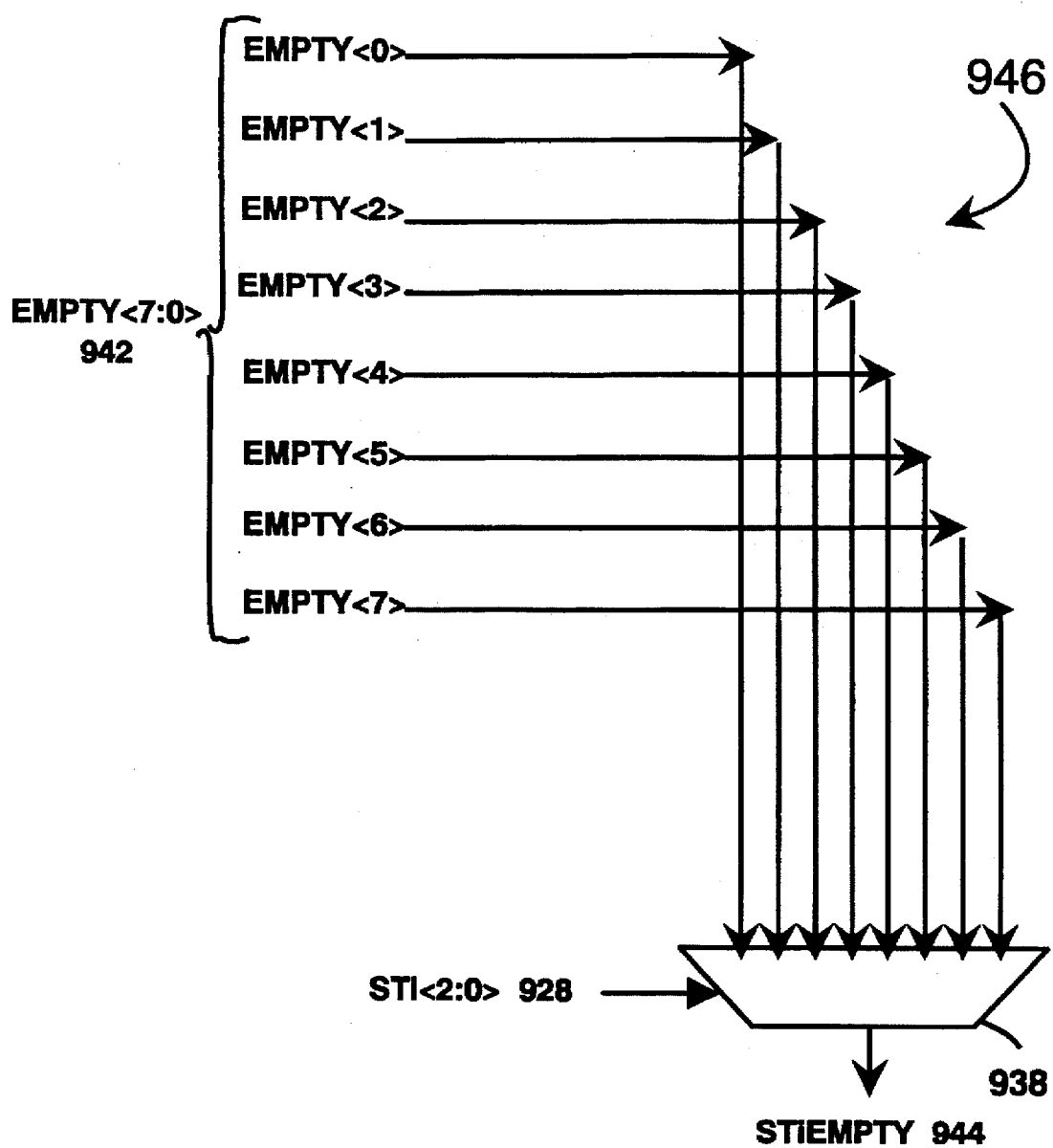

Referring to FIG. 13, an empty circuit 946 is depicted in which data held in a full/empty array 942 (EMPTY<7:0>) are applied to a multiplexer 938 to generate STiEMPTY 944 signals for the eight stack elements i=0 through 7. Output signals STiEMPTY 944 designate whether an element of a stack is full or empty. STiEMPTY 944 is the value of the element of the lookahead full/empty array EMPTY (EMPTY<7> ... EMPTY<0>) addressed by the output of the lookahead stack registers STi<2:0> 928. A STiEMPTY 944 value of 1 indicates that the designated floating point stack array element is defined (full) and a value of 0 indicates that the stack element is not defined (empty). A multiplexer 938 of the empty circuit 946 is duplicated four times in the instruction decoder 118 to furnish the lookahead full/empty array 506 for each of the four dispatch positions. The lookahead full/empty array 506 (EMPTY<7:0>) corresponds to full/empty array 942 (EMPTY<7:0>) addressed by the output of the lookahead stack registers STi<2:0>. One empty circuit 946 also is included in the register file 124 to furnish the floating point full/empty array 806, which corresponds to full/empty array 942 (EMPTY<7:0>) addressed by the output of the floating point stack registers STi<2:0>.

Figure 14:
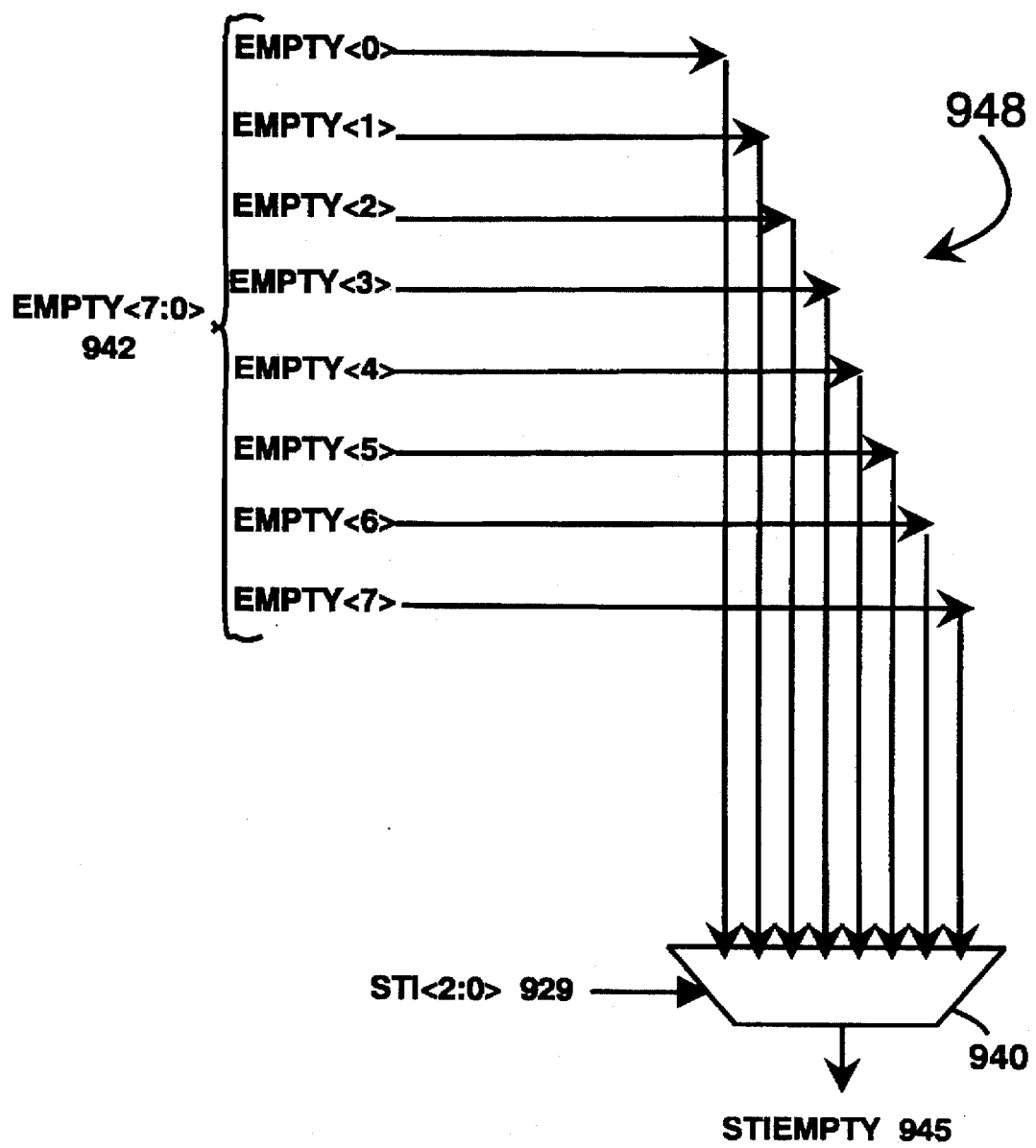

Each of the eight full/empty array elements can be addressed using the pointer REG2. Referring to FIG. 14, an empty circuit 948 is depicted in which data held in full/empty array 942 (EMPTY<7:0>) are applied to a multiplexer 940 to generate a STIEMPTY 945 signal. Signal STI<2:0> 929 selects an element of the stack full/empty array 942. STIEMPTY 945 is the value of the element of the full/empty array EMPTY (EMPTY<7> ... EMPTY<0>) 942 addressed by the stack signal STI<2:0> 929, which is determined by pointer REG2. A multiplexer 940 of the empty circuit 948 is shared between the decoder dispatch positions in the instruction decoder 118 to furnish the lookahead full/empty array 506. The lookahead full/empty array 506 (EMPTY<7:0>) corresponds to full/empty array 942 (EMPTY<7:0>) addressed by the output of the lookahead stack registers STI<2:0>. One empty circuit 948 also is included in the register file 124 to furnish the floating point full/empty array 806, which corresponds to full/empty array 942 (EMPTY<7:0>) addressed by the output of the floating point stack register STI<2:0>.

For each of the four dispatch positions, stack underflow and overflow conditions are tested and results are generated from the analysis of various stack full/empty array 506 conditions. Two possible underflow indicators, one for each of the A and B source operands, and one overflow indicator, relating to the destination operand, are generated in response to certain types of floating point operations and branch instructions that derive two STACKUNDER and a single STACKOVER indicators. The STACKUNDER (A and B) and STACKOVER indicators are communicated from instruction decoder 118 to floating point functional unit 122 and branch unit 120 when the next ROP pair is dispatched to the floating point unit. A stack overflow condition is detected when the operation designates a stack push and ST7EMPTY indicates that the stack element is not empty.

FIGS. 15, 16, 17 and 18 depict changes in stack arrays and registers resulting from dispatching and execution of the following CISC-type instruction code:

| | |
|---|---|
| FADDP | // add with stack pop |
| FXCH ST(2) | // exchange |
| FMUL | // multiply |

FIGS. 15A, 15B and 15C show stack registers and arrays before operations are dispatched, when remap arrays are in an initial condition. FIG. 15A depicts lookahead TOS 502, lookahead remap array 504 and lookahead full/empty array 506 of instruction decoder 118. FIG. 15B depicts branch remap array 904 of branch unit 120. FIG. 15C illustrates floating point TOS 672, remap array 674, stack array 700 and full/empty array 676 of register file 124. Floating point TOS 672 has a value of 4, pointing to location 4 of floating point remap array 674. Lookahead remap array 504 holds pointer values that are set at initialization, in which the pointers are successively incremented by one in sequence from 0 to 7. Floating point remap array 674 and lookahead remap array 504, which point to stack array 700 and full/empty array 676 elements, are set in this manner at initialization and change only in response a floating point exchange (FXCH) instruction.

In FIGS. 15A and 15C, the top of stack is 4 and location 4 of the remap array points to location 4 of floating point stack array 700, which contains the value 2.0. Floating point stack 700 contains data only in array elements 4 through 7. Thus, full/empty array 676 and lookahead full/empty array 506 elements are set to 1 in register elements 4 through 7 to indicate that data values are present in the corresponding stack 700 elements. Instruction decoder 118 uses two cycles to dispatch the three instructions. In the first cycle, the decoder dispatches FADDP to floating point unit 122 and dispatches FXCH to branch unit 120.

FIGS. 16A, 16B and 16C depict stack register and array values once the FADDP and FXCH instructions are dispatched but before execution of either instruction. FADDP is converted by the instruction decoder 118 to an ROP sequence which adds the floating point stack array 700 entry at the top of the stack, 2.0, to the stack value at the position one removed from TOS (location 5), 3.0, increments TOS (to location 5) and stores the sum of 5.0 on the TOS. Thus in FIG. 16A, instruction decoder 118 updates lookahead TOS 502 to 5 to implement the stack pop and sets lookahead full/empty array 506 location 4 to 0.

FXCH commands exchange of the contents of the storage element at TOS and the designated stack location, two elements removed from TOS. The processor does this, not by exchanging data in stack registers, but rather by exchanging pointers 5 and 7 in lookahead remap array 504. In FIG. 16A, instruction decoder 118 exchanges the pointers at the TOS position 5 and at position 7 and dispatches FADDP and FXCH. FIG. 16C shows floating point TOS 672, remap array 674, stack array 700 and full empty array 676 are not changed from their values of FIG. 12 by dispatch of an ROP.

FIGS. 17A, 17B and 17C depict stack registers and arrays after execution of FADDP and FXCH ROPs and after FMUL is dispatched. In FIG. 17A, the dispatch of FMUL does not change lookahead TOS 502 or full/empty array 506 because FMUL does not modify the stack. Likewise, dispatch of FMUL does not change lookahead remap array 504 because only an exchange instruction, FXCH, alters a remap array value. In FIG. 17B, execution of FXCH causes lookahead remap array 504 to be copied to the branch remap array 904. FIG. 17C shows that none of FADDP, FXCH or FMUL are retired and that floating point TOS 672, remap array 674, stack array 700 and full/empty array 676 are not changed until an ROP is retired.

Figures 18A, 18B, 18C:
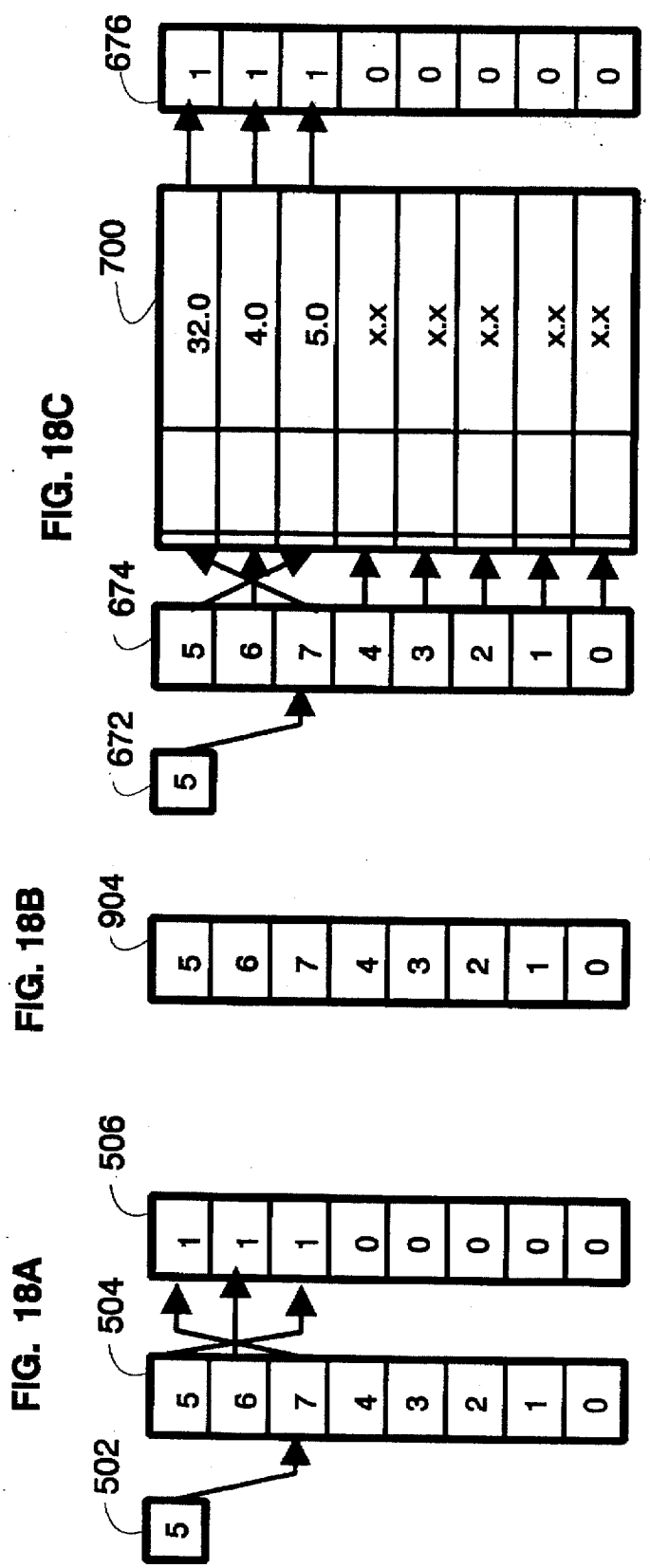

FIGS. 18A, 18B and 18C depict stack registers and arrays after retirement of the FADDP, FXCH and FMUL ROPs. In response to FADDP, floating point functional unit 122 adds 2.0 from the former top of the stack and 3.0 from the next location on the stack and therein stores the sum. Floating point TOS 672 is incremented to 5. Upon FXCH execution, lookahead remap array 504 is written to floating point remap array 674 when the instruction is retired. Lookahead TOS 502 is updated as FADDP is retired. FMUL multiplies the top of the stack entry (8.0 at location 5) by the stack entry at the position one removed from the TOS (4.0 at location 6). FMUL stores the product at TOS at location 5. In FIG. 18C, in response to the FMUL ROP, floating point stack array 700 contains the multiplication product.

If branch unit 120 detects a problem with the FXCH instruction, such as a stack underflow error, branch unit 120 returns status flags (not shown) to reorder buffer 126 which indicate existence of a resynchronization condition. These flags include an asserted exception condition notification. Reorder buffer 126 initiates the resynchronization response by sending exception and resynchronization signals (not shown) to branch unit 120. Branch unit 120 responds to these signals by redirecting fetch PC to the position of the FXCH instruction and restoring lookahead TOS 502, lookahead remap array 504 and lookahead full/empty array 506 to their state prior to decoding of FXCH. In this state, lookahead TOS 502 and lookahead full/empty array 506 are updated to correspond to their state after decoding of FADDP as shown in FIG. 16A and lookahead remap array 504 is restored to the state prior to decoding of FXCH, depicted in FIG. 15A.

If a conditional branch instruction is dispatched after the FXCH instruction and the branch instruction is found by branch unit 120 to be mispredicted, branch unit 120 redirects the fetch PC of instruction cache 116 to the appropriate instruction pointer and rewrites lookahead remap array 504 with the array stored in branch remap array 904, shown in FIGS. 17B and 18B, that corresponds to the FXCH instruction.

When an exception condition is detected by a functional element of processor 110, floating point TOS 672, remap array 674 and full/empty array 676 at the time the exception is retired are respectively written to lookahead TOS 502, remap array 504 and full/empty array 506.

Figure 19:
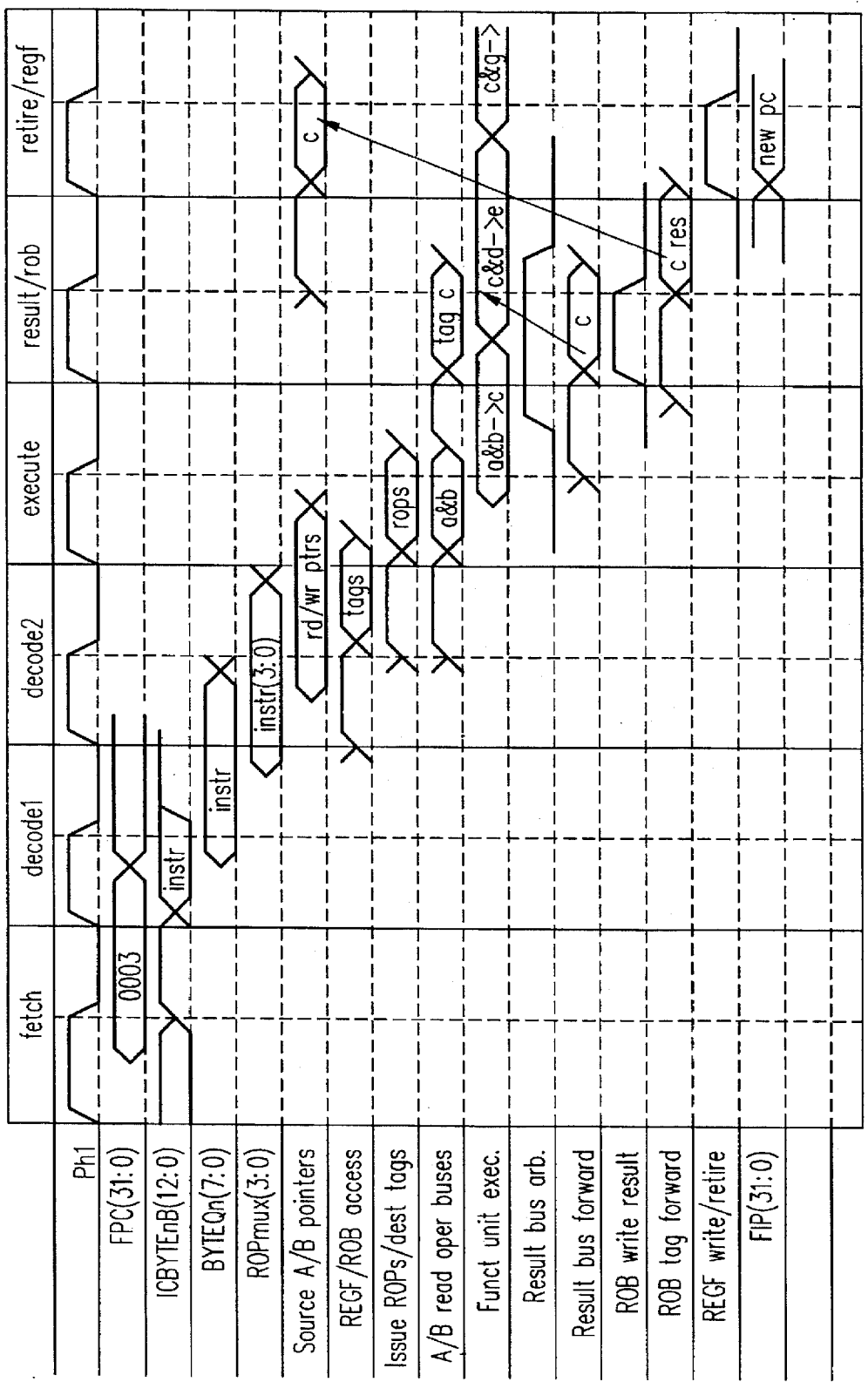
FIG. 19 is a timing diagram for a multiple stage sequential execution pipeline in the processor 110.

The processor 110 operates as a multiple stage pipeline. FIG. 19 depicts a timing diagram for a sequential execution pipeline. The stages, in order, include a fetch stage, a decode1 stage, a decode2 stage, an execute stage, a result stage and a retire stage.

During decode1, speculative instructions are fetched, instruction decoder 118 decodes instructions and the instructions become valid. Instruction decoder 118 updates lookahead TOS 502, lookahead full/empty array 506 and lookahead remap array 504 so that the stack information, including STI, STIEMPTY, STi and STiEMPTY (i=0 to 7), is updated during decode2.

During decode2, outputs of instruction decoder 118 become valid. For example, operand busses 130 and 131 and operand tag busses 148 and 149 become valid early in decode2, allowing the operands from register file 124 and reorder buffer 126 and operand tags from reorder buffer 126 to become available in late decode2.

During execute, the operand busses 130 and 131 and tags 148 and 149 become valid and are furnished to functional unit reservation stations. Functional units execute ROPs and arbitrate for a result bus. When an FXCH ROP is executed, branch unit 120 saves the current version of lookahead remap array 504. For a branch instruction, branch unit 120 preserves lookahead TOS 502 and the lookahead full/empty array 506. For a mispredicted branch, lookahead TOS 502, lookahead full/empty array 506 and lookahead remap array 504 are restored from values saved by the branch unit 120.

During result, functional units write results to reorder buffer 126 and to reservation stations. After a stack exchange instruction result is written, floating point remap array 674 is replaced by branch remap array 904 in a late phase of the result stage. After the result of an ROP that pushes or pops is written to the reorder buffer 126, the TOS 672 and floating point full/empty array 676 are updated in a late phase of the result stage. During retire, operands are retired from reorder buffer 126 to register file 124.

Figure 20:
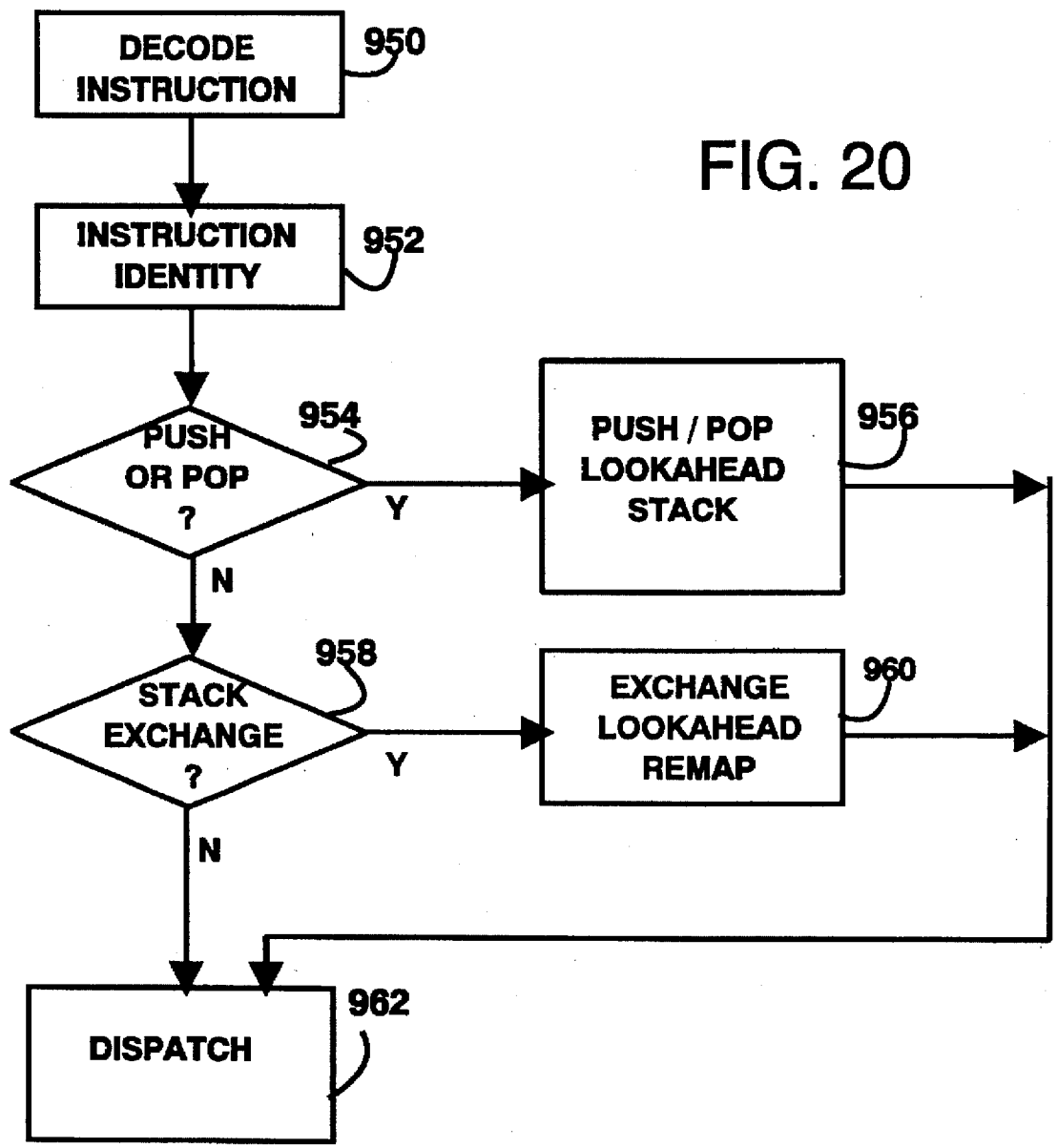
FIGS. 20, 21 and 22 illustrate flow charts of procedures performed in various function blocks that, in combination, control the stack.

FIG. 20 illustrates a flow chart of a procedure performed by instruction decoder 118, as part of a method for controlling a stack in a superscalar processor. This procedure is repeated for each operation of up to four ROPs that are dispatched in a dispatch window. In the illustrative processor 110, at most two floating point instructions or only one floating point instruction and two non-floating point instructions are placed in one dispatch window. This effectively limits the number of ROPs that affect the floating point stack to two in a dispatch window. Instruction decoder 118 decodes an instruction in step 950 and, in step 952, determines whether the decoded instruction is one that affects the stack. Instructions that do not directly alter the stack, such as branch instructions, also are processed by the instruction decoder 118. To simplify the flow chart, only functions that update stack parameters are depicted in FIG. 20. Stack-adjusting instructions include stack element exchange ROPs and ROPs that push and pop the stack.

Under control of logic step 954, if an ROP pushes or pops the stack, instruction decoder 118 updates lookahead TOS by decrementing or incrementing lookahead TOS 502 and by updating lookahead full/empty array 506. In step 956, lookahead TOS 502 is decremented for a push function and incremented for a pop function. Note that different stack implementations may be adjusted either by incrementing or decrementing the stack pointer for either a push or a pop operation. It is to be understood that a stack that is decremented in a push operation and incremented in a pop operation is equivalent to the disclosed stack embodiment and is within the scope of the invention. The lookahead full/empty array 506 element that is specified upon a push of the stack is set to 1 and TOS pointer is decremented. The lookahead full/empty array 506 element that is designated prior to a pop of the stack is cleared to 0 and TOS pointer 502 is incremented in a pop operation.

For a stack element exchange ROP identified by logic step 958, instruction decoder 118, in step 960, exchanges elements of the lookahead remap array 504 that are designated by the instruction.

Figure 21:
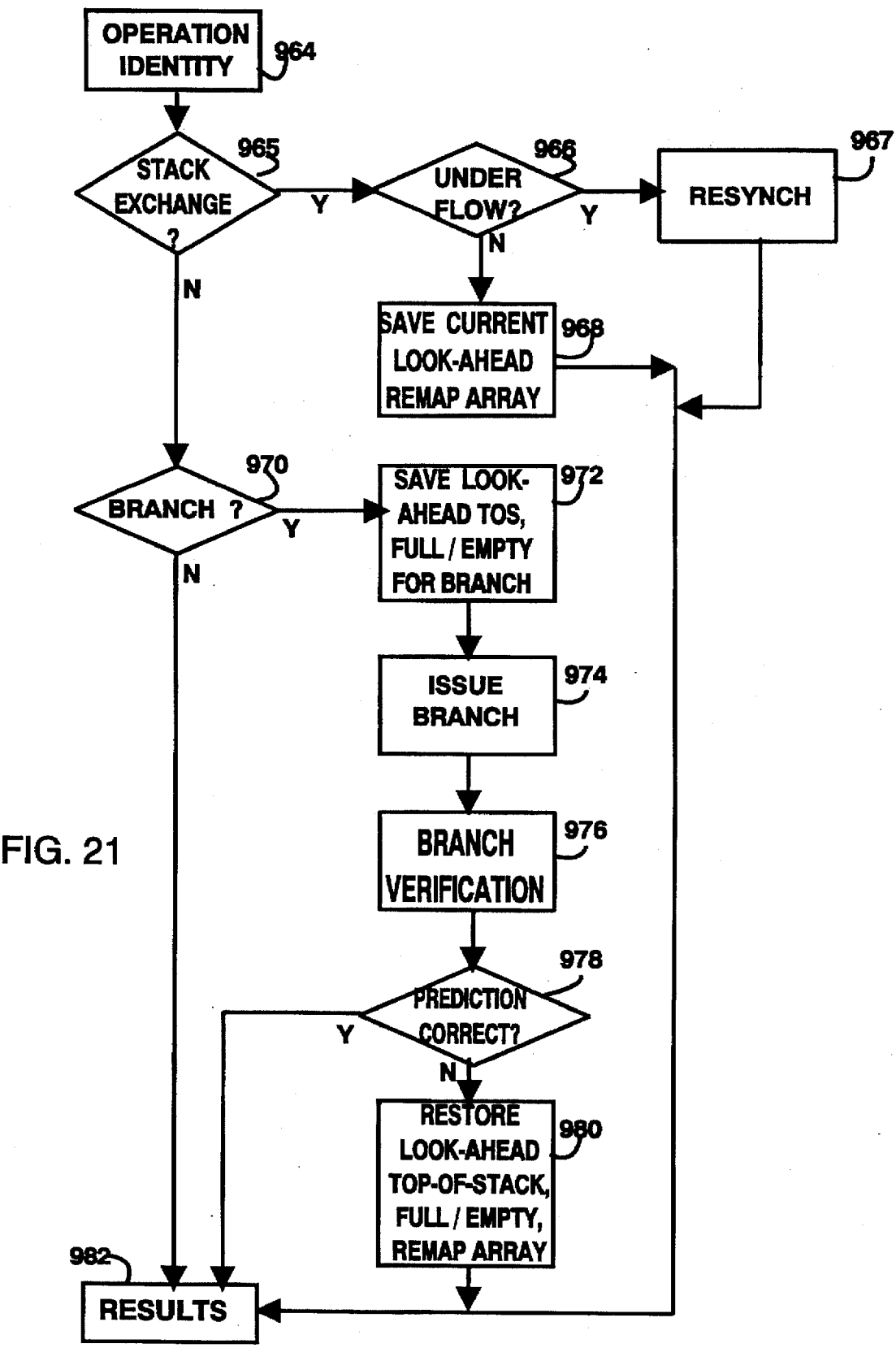

All ROPs, including those that do not affect the stack, are dispatched by instruction decoder 118 to various functional units in step 962. For example, branch operations are dispatched to branch unit 120. FIG. 21 depicts a flow chart of a procedure that is performed by branch unit 120, as a second part of the method for controlling a stack in a superscalar processor. ROPs that are dispatched to branch unit 120 include stack exchange instructions and various branch ROPs. ROPs are identified in the operation identity step 964.

If the instruction is a stack element exchange instruction, according to logic step 965, branch unit 120 in step 966 determines whether a stack underflow error has occurred by testing the STACKUNDER indication. If underflow occurs, a resynchronization procedure is administered in step 967. If stack underflow has not occurred, lookahead remap array 504, which has been updated for the exchange operation by the instruction decoder 118, is saved in step 968. All elements of lookahead remap array 504 are written to entries within branch remap array 904.

For a branch ROP, detected in logic step 970, branch unit 120 in step 972 locally saves lookahead TOS 502 and lookahead stack full/empty array 506 in a reservation station 902 memory to correlate stack parameters with the dispatched branch ROP. Reservation station 902 resolves conflicts that prevent execution of the branch ROP and issues the ROP in step 974. Upon issue of the ROP, branch unit 120 executes a branch verification step 976. If a misprediction is detected, branch unit 120, under direction of the prediction correct logic step 978, restores the lookahead state of the processor 110 in step 980 by replacing lookahead TOS 502 and lookahead stack full/empty array 506 in the instruction decoder 118 with values that were stored in branch unit reservation station 902 in step 972.

Figure 22:
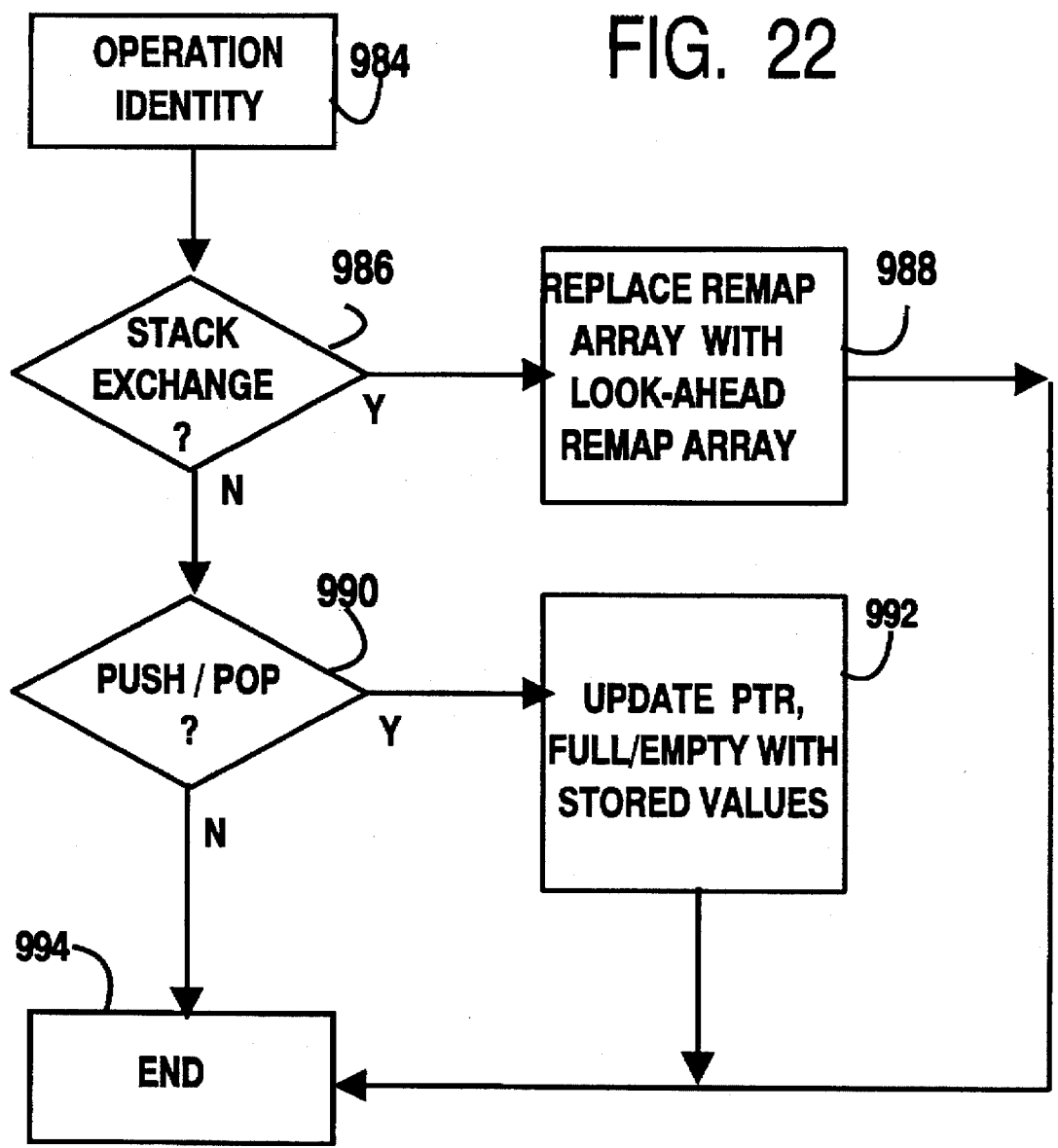

Whether the branch is predicted or mispredicted, branch unit 120 finishes the current branch operation by writing result information to one of the result busses 132 in step 982. FIG. 22 depicts a schematic flow chart of a procedure performed by reorder buffer 126 and register file 124 in combination as a third part of the method for controlling a stack in a superscalar processor. Branch information that is returned to reorder buffer 126 and register file 124 on result busses 132 when a branch instruction is complete includes lookahead remap array 504. Parameters updated when floating point functional unit 122 finishes execution are floating point TOS 672 and floating point full/empty array 676. Reorder buffer 126 and register file 124 update stack-related registers and locations when a stack exchange operation or a floating point operation that pushes or pops the stack finishes execution and its operands are retired. The identity of the ROP is recognized in the identity step 984.

If the ROP is a stack exchange instruction, as determined in logic step 986, floating point remap array 674 within reorder buffer 126 is replaced in step 988 by lookahead remap array 504 from branch remap array 904 in branch unit 120. Similarly, if the operation is a stack push or pop according to logic step 990, floating point TOS 672 is respectively decremented or incremented. In step 992, the floating point full/empty array 676 element that is addressed by TOS 672 after the stack is pushed is set to 1 when the push is retired. The floating point full/empty array 676 element addressed by the TOS 672 prior to popping the stack is cleared to 0 when the stack pop is retired.

The foregoing description particularly specifies many attributes of the stack and processor, including locations of various blocks, circuits, pointers and arrays. The stack is illustratively embodied as a floating point stack. These attributes do not limit the invention scope but rather illustrate a preferred embodiment. For example, each of the various data structures may be implemented in any portion of the processor. The stack may be an independent general purpose stack or it may be placed within a particular functional block. The stack may operate in response to general purpose stack calls or may function only when a particular operation is executing. The stack need not be associated with floating point operations. The stack may be incorporated into processors that are not superscalar or into superscalar processors having various numbers of pipelines and having a capability of handling various multiple numbers of ROPs during a clock cycle. The scope of the invention is determined by the appended claims and their equivalents.

We claim:

1. A processor for concurrently performing multiple operations, the operations being selected from an instruction set including floating point calculation instructions, floating point stack exchanges and instructions that push or pop a floating point stack, the processor comprising:

an instruction decoder for decoding instructions in the instruction set including the floating point stack exchange instruction;

a branch unit coupled to the instruction decoder for determining speculative execution of instructions in the instruction set, the branch unit for executing the floating point stack exchange instruction in accordance with the speculative execution;

a floating point functional unit coupled to the instruction decoder for executing floating point calculation instructions; and a floating point stack coupled to the floating point functional unit including:

a floating point stack array to store calculation results received from the floating point functional unit;

a floating point stack pointer coupled to the floating point stack array to specify an array element; and a floating point stack remap array coupling the floating point stack pointer to the floating point stack array for reordering floating point stack array elements addressed by the stack pointer.

2. A processor as in claim 1 wherein the floating point stack is operable independent of the floating point functional unit so that floating point stack exchange instructions are executable concurrent with floating point calculations.

3. A processor as in claim 1 wherein the instruction set further includes a branch instruction, wherein the floating point stack further comprises:

a lookahead remap array responsive to a floating point stack exchange instruction by exchanging array elements; and a lookahead stack pointer coupled to the lookahead remap array to specify an element of the floating point stack array and responsive to instructions that pop or push the floating point stack to adjust the pointer; wherein the branch unit is coupled to the lookahead remap array and the lookahead stack pointer, the branch unit further including:

a memory to save the lookahead remap array responsive to a branch instruction, a branch predictor to predict whether the branch is taken or not taken;

a branch comparator coupled to the branch predictor to determine whether the branch is predicted or mispredicted;

first control lines coupled between the memory and the lookahead remap array, responsive to a mispredicted branch to communicate the saved values to the array; and second control lines coupling the lookahead remap array and stack pointer respectively to the floating point remap array and stack pointer, responsive to execution of a stack exchange instruction by respectively replacing floating point values with lookahead values.

4. A processor as in claim 1 wherein the floating point stack further includes:
   a floating point stack full/empty array coupled to the floating point remap array and designating whether a floating point stack element is empty or full, and
   a lookahead stack full/empty array coupled to the lookahead remap array to monitor a lookahead state of the floating point stack full/empty array.

5. A method of controlling a stack in a processor that performs an instruction set including a stack exchange instruction, instructions that push or pop the stack and instructions that access the stack, the method comprising the steps of:
   decoding an instruction in an instruction decoder to determine its directive;
   directing the exchange of elements of a stack remap array in a branch unit for controlling speculative execution when the directive is a stack exchange instruction;
   adjusting a stack pointer in one direction in the instruction decoder when the directive is a stack push;
   adjusting the stack pointer in another direction in the instruction decoder when the directive is a stack pop; and
   utilizing a stack array element designated by the stack pointer and reordered by the stack remap array when the directive is a stack access.

6. A method of controlling a stack in a processor that performs an instruction set including a stack exchange instruction, instructions that push or pop the stack, instructions that access the stack and conditional branch instructions, the method comprising the steps of:
   decoding an instruction in an instruction decoder to determine its directive;
   directing the exchange of elements of a lookahead stack remap array in a branch unit for controlling speculative execution responsive to a stack exchange instruction;
   adjusting a lookahead stack pointer in an instruction decoder as directed in response to an instruction that pushes or pops the stack;
   utilizing a stack array element designated by the lookahead stack pointer and reordered by the lookahead stack remap array in response to an instruction that accesses the stack;
   responding to a conditional branch instruction in a branch unit, including the steps of:
     saving the lookahead remap array,
     predicting whether the branch is taken or not taken,
     determining whether the branch is predicted correctly or mispredicted and
     restoring the lookahead remap array to the saved value when the branch instruction is mispredicted; and
   retiring the instruction in its program order as directed by a reorder buffer retirement logic, including the steps of:
     replacing the stack remap array with the lookahead remap array responsive to a retiring stack exchange instruction, and
     adjusting the stack pointer responsive to a retiring instruction that pushes or pops the stack.

7. A method as in claim 6, further comprising the steps of:
   setting and clearing an entry in a lookahead full/empty array responsive to instructions that push and pop the stack; and
   setting and clearing an entry in a lookahead full/empty array responsive to retiring of an instruction that pushes or pops the stack.

8. A method as in claim 7, further comprising the steps of:
   detecting a stack execution error including the steps of:
     determining whether all elements of the lookahead full/empty array are full;
     determining whether all elements of the lookahead full/empty array are empty;
     detecting a stack underflow error responsive to an instruction that pops the stack when all elements of the lookahead full/empty array are empty; and
     detecting a stack overflow error responsive to an instruction that pushes the stack when all elements of the lookahead full/empty array are full; and
   initiating a resynchronization response in response to a detected stack execution error.

9. A method as in claim 7, further comprising the steps of:
   detecting an exception condition; and
   copying the stack remap array to the lookahead stack remap array and copying the stack pointer to the lookahead stack pointer responsive to the detected exception condition.

10. A stack in a processor which performs an instruction set including stack exchange instructions and instructions that push or pop the stack, the stack comprising:
    an instruction decoder for decoding instructions in the instruction set including the stack exchange instruction;
    a branch unit coupled to the instruction decoder for determining speculative execution of instructions in the instruction set, the branch unit for executing the stack exchange instruction in accordance with the speculative execution;
    a stack memory array coupled to the instruction decoder and the branch unit;
    a stack pointer coupled to the stack memory array to designate a stack memory array element, the stack pointer being adjusted in response to instructions that push or pop the stack; and
    a stack remap array of pointers coupled to the stack pointer and coupled to the stack memory array to reorder stack array elements as they are addressed by the stack pointer, the pointers being exchanged in response to a stack exchange instruction.

11. A stack as in claim 10, further comprising:
    a stack full/empty array coupled to the stack remap array and addressed through the stack remap array by the stack pointer to reorder stack array elements as they are addressed by the stack pointer, the stack full/empty array elements being respectively set and cleared in response to instructions that push and pop the stack, indicating respective addition or elimination of stack array entries.

12. A stack in a processor which concurrently fetches, decodes, executes and retires a plurality of instructions of an instruction set including branch instructions, stack exchange instructions, instructions that push the stack and instructions that pop the stack, the processor including a branch unit having a branch predictor responsive to a conditional branch instruction to predict whether a branch is taken or not taken and having a branch tester coupled to the branch predictor to subsequently determine whether the conditional branch is predicted or mispredicted, the stack comprising:
    a stack memory array;
    a stack pointer coupled to the stack memory array to designate a stack memory array element, the stack pointer being adjusted in response to instructions that push or pop the stack;

a stack remap array of pointers coupled to the stack pointer and coupled to the stack memory array to reorder stack array elements addressed by the stack pointer, the pointers being exchanged in response to a stack exchange instruction;

a lookahead stack pointer designating a lookahead state of the stack pointer, the lookahead stack pointer being adjusted in response to instructions that push or pop the stack;

a lookahead remap array coupled to the lookahead stack pointer to reorder stack array elements addressed by the stack pointer, the elements of the lookahead remap array being exchanged in response to a stack exchange instruction;

a memory coupled to the branch unit and responsive to a stack exchange instruction to save the lookahead remap array;

a memory coupled to the branch unit and responsive to instructions that push or pop the stack to save the lookahead stack pointer;

means coupled to the branch tester and responsive to a mispredicted branch for restoring the lookahead remap array and the lookahead stack pointer to saved values; and means responsive to retiring of a stack exchange instruction for replacing the stack remap array with the lookahead remap array.

13. A stack as in claim 12, further comprising:
lookahead full/empty array coupled to the lookahead remap array and addressed through the lookahead remap array by lookahead stack pointer to reorder stack array elements, the lookahead full/empty array elements being respectively set and cleared in response to instructions that push and pop the stack, indicating respective addition or elimination of stack array entries.

14. A stack as in claim 13 in a processor further including an instruction decoder coupled to the lookahead stack pointer, the lookahead remap array and the lookahead full/empty array, the stack including:
means coupled to the instruction decoder and responsive to a stack exchange instruction for exchanging pointers in the lookahead remap array; and
means coupled to the instruction decoder and responsive to instructions that push the stack and to instructions that pop the stack for adjusting the lookahead stack pointer and respectively adding and eliminating entries in the lookahead full/empty array.

15. A stack as in claim 14, wherein the stack further includes:
means coupled to the instruction decoder for detecting a stack execution error; and
means responsive to the detecting means stack error detection for initiating a resynchronization response.

16. A stack as in claim 13 in a processor further including a reorder buffer coupled to the stack pointer and to the remap array and a register file coupled to the stack memory array, the stack further including:
a stack full/empty array coupled to the reorder buffer and coupled to the stack pointer through the stack remap array.

17. A stack as in claim 16, the processor including an exception condition detector, wherein the stack further comprises:
means coupled to the instruction decoder and responsive to an exception condition for replacing the lookahead remap array with the stack remap array, replacing the lookahead stack full/empty array with the stack full/empty array, and replacing the lookahead stack pointer with the stack pointer.

18. A stack as in claim 13, the processor further including a floating point functional unit, wherein the floating point functional unit operates on data contained within the stack memory array.

19. A processor which concurrently executes a plurality of instructions from an instruction set including branch instructions, stack element exchange instructions and instructions that push and pop the stack, the stack comprising:
a register file including a stack memory array;
a reorder buffer coupled to the register file including:
a stack pointer to specify a stack memory array element and
a stack remap array coupling the stack pointer to the stack memory array to reorder stack memory elements addressed by the stack pointer;
an instruction decoder coupled to the register file and the reorder buffer including:
a lookahead stack pointer;
a lookahead remap array coupled to the lookahead stack pointer;
a decoder circuit coupled to the lookahead stack pointer and the lookahead remap array;
means responsive to decoding of a stack element exchange instruction for exchanging lookahead remap array elements;
means responsive to a decoding of an instruction that pushes or pops the stack for adjusting the lookahead stack pointer;
a branch unit, coupled to the instruction decoder to receive copies of the lookahead remap array and the lookahead stack pointer, including:
a memory responsive to a branch instruction to save copies of the lookahead remap array and the lookahead stack pointer therein;
a branch predictor responsive to a conditional branch instruction to predict whether a branch is taken or not taken;
a branch tester coupled to the branch predictor to subsequently determine whether the conditional branch is predicted or mispredicted;
means responsive to a mispredicted branch for replacing the lookahead remap array with the saved lookahead remap array and replacing the lookahead stack pointer with the saved lookahead stack pointer; and
means responsive to completion of execution of a stack element exchange instruction for replacing the stack remap array with the saved lookahead remap array.

20. A processor as in claim 19, further comprising:
means coupled to the instruction decoder for detecting a stack execution error; and
means responsive to the detecting means stack error detection for initiating a resynchronization response.

21. A processor as in claim 19, further comprising:
means for detecting an exception condition and,
means coupled to the instruction decoder and responsive to an exception condition for replacing the lookahead remap array with the stack remap array, replacing the lookahead stack full/empty array with the stack full/empty array, and replacing the lookahead stack pointer with the stack pointer.

22. A processor as in claim 19, further comprising:
a floating point functional unit, wherein the floating point functional unit operates on data contained within the stack memory array.

23. A stack in a processor which performs instructions from an instruction set including stack pushes and pops and branch instructions, the processor including a decoder which dispatches instructions, a branch unit coupled to the decoder which predicts conditional branch instructions and detects mispredictions, a plurality of functional units coupled to the decoder to speculatively execute instructions in reliance on the predictions and a memory coupled to the decoder and the functional units to receive results of retired instructions, the stack comprising:
a plurality of storage elements coupled to the reorder buffer;
a pointer coupled to the storage elements and coupled to the reorder buffer for addressing ones of the plurality of storage elements;
a lookahead pointer coupled to the decoder for addressing ones of the plurality of storage elements when the functional units are speculatively executing instructions;
a stack controller coupled to the storage elements, the pointer, the lookahead pointer, and the decoder, including:
means responsive to dispatching of stack pushes and stack pops for updating the lookahead pointer;
means responsive to retiring of stack pushes and stack pops for copying the lookahead pointer to the pointer;
means responsive to dispatching of a conditional branch instruction for saving the lookahead pointer; and
means responsive to a branch misprediction for restoring the lookahead pointer to the saved value.

24. A stack as in claim 23, further comprising:
a full/empty array coupled to the pointer and having elements corresponding to ones of the plurality of storage elements to indicate whether the storage elements are full or empty, wherein the stack controller further comprises:
means responsive to dispatching of stack pushes and stack pops for adjusting the full/empty array;
means responsive to retiring of stack pushes and stack pops for adjusting the full/empty array;
means responsive to a conditional branch instruction prediction for saving the full/empty array; and
means responsive to a branch misprediction for restoring the full/empty array to the saved value.

25. A stack in a processor which performs instructions from an instruction set including stack pushes and pops and branch instructions, the processor including a decoder which dispatches instructions, a branch unit coupled to the decoder which predicts conditional branch instructions and detects mispredictions, a plurality of functional units coupled to the decoder to speculatively execute instructions in reliance on the predictions and a memory coupled to the decoder and the functional units to receive results of retired instructions, the stack comprising:
a plurality of storage elements coupled to the reorder buffer;
a remap array coupled to the storage elements and the reorder buffer to reorder ones of the plurality of storage elements;
a pointer coupled to the storage elements through the remap array to address ones of the plurality of storage elements;
a lookahead pointer coupled to the decoder and addressing ones of the plurality of storage elements when the functional units are speculatively executing instructions;
a lookahead remap array coupled to the storage elements and the decoder for reordering ones of the plurality of storage elements when the functional units are speculatively executing instructions for dispatched stack exchange instructions;
a stack controller connected to the storage elements, the remap array, the pointer, the lookahead pointer, the speculative branch lookahead pointer and the lookahead remap array, including:
means coupled to the decoder and responsive to dispatching of stack pushes and stack pops for updating the lookahead pointer;
means coupled to the reorder buffer and responsive to retiring of stack pushes and stack pops for copying the lookahead pointer to the pointer;
means coupled to the decoder and responsive to dispatching of a conditional branch instruction for saving the lookahead pointer;
means coupled to the branch unit and responsive to a branch misprediction for restoring the lookahead pointer to the saved value;
means coupled to the branch unit and responsive to dispatching of a stack exchange instruction for exchanging elements of the lookahead remap array;
means coupled to the branch unit and responsive to dispatching of a conditional branch instruction prediction for saving the lookahead remap array to the speculative branch lookahead remap array;
means coupled to the branch unit and responsive to a branch misprediction for restoring the lookahead remap array to the saved value; and
means coupled to the reorder buffer and responsive to retiring of a stack exchange instruction for copying the lookahead remap array to the remap array.

26. A method for operating a processor stack array comprising the steps of:
selecting an element of the stack array using a stack pointer;
reordering stack array elements which are designated by the stack pointer using a remap array;
storing a lookahead state of the stack in a lookahead stack pointer memory that corresponds to the stack pointer and a lookahead remap array that corresponds to the remap array;
exchanging elements of the lookahead remap array in response to a stack element exchange instruction as directed by the speculative state of the branch unit;
adjusting the lookahead stack pointer in response to an instruction that pushes or pops the stack;
speculatively executing instructions in a branch unit including branch instructions, stack exchange instructions and instructions that push or pop the stack;
saving the lookahead stack pointer and lookahead remap array in correspondence with a speculatively executed branch instruction;
retiring speculatively executed instructions including:
replacing the remap array with the lookahead remap array in response to a retiring stack exchange instructions, and
adjusting the stack pointer in response to retiring instructions that push or pop the stack; and restoring the lookahead stack pointer and the lookahead remap array to saved values in response to a mispredicted branch.

27. A method as in claim 26, further comprising the steps of:

monitoring whether the stack array elements are empty or full using a full/empty array coupled to the pointer, the full/empty array having elements that correspond to elements of the stack array, wherein the stack controller further comprises:

adjusting a lookahead copy of the full/empty array by respectively adding and eliminating entries as directed in response to dispatching of instructions that push and pop the stack, adjusting a permanent copy of the full/empty array by respectively adding and eliminating entries as directed in response to retiring of instructions that push and pop the stack, saving the lookahead full/empty array in response to a conditional branch instruction prediction, and restoring the lookahead full/empty array to the saved speculative branch lookahead full/empty array in response to detection of a branch misprediction.

* * * * *